US012695303B1

(12) United States Patent
Donnelly et al.

(10) Patent No.: US 12,695,303 B1
(45) Date of Patent: Jul. 28, 2026

(54) OPTIMAL CONTROL THEORY APPROACH FOR POWER GRID EMP PROTECTION

(71) Applicants: National Technology & Engineering Solutions of Sandia, LLC, Albuquerque, NM (US); Michigan Technological University, Houghton, MI (US)

(72) Inventors: Timothy James Donnelly, Albuquerque, NM (US); David G. Wilson, Tijeras, NM (US); Rush Robinett, III, Tijeras, NM (US); Wayne Weaver, Hancock, MI (US)

(73) Assignees: National Technology & Engineering Solutions of Sandia, LLC, Albuquerque, NM (US); Michigan Technological University, Houghton, MI (US)

( * ) Notice: Subject to any disclaimer, the term of this patent is extended or adjusted under 35 U.S.C. 154(b) by 255 days.

(21) Appl. No.: 18/592,515

(22) Filed: Feb. 29, 2024

Related U.S. Application Data

(60) Provisional application No. 63/450,242, filed on Mar. 6, 2023.

(51) Int. Cl.
| | |
|---|---|
| *H02J 3/001* | (2026.01) |
| *H02H 1/04* | (2006.01) |
| *H02H 3/17* | (2006.01) |
| *H02H 7/04* | (2006.01) |
| *H02J 103/30* | (2026.01) |

(52) U.S. Cl.
CPC ....... *H02J 3/00125* (2020.01); *H02J 2103/30* (2026.01)

(58) Field of Classification Search
CPC .. H02J 3/00125; H02J 2203/20; H02H 1/046; H02H 3/17; H02H 7/04
See application file for complete search history.

(56) References Cited

U.S. PATENT DOCUMENTS

| | | | | | |
|---|---|---|---|---|---|
| 5,751,524 | A | * | 5/1998 | Swindler | .................. H02H 7/22 361/115 |
| 12,500,415 | B1 | * | 12/2025 | Rashkin | .................. H02J 3/001 |

(Continued)

OTHER PUBLICATIONS

Bolduc, L. et al., "Development of a DC Current-Blocking Device for Transformer Neutrals," IEEE Transactions on Power Delivery, 2005, vol. 20, pp. 163-168.

(Continued)

*Primary Examiner* — Sisay G Tiku
(74) *Attorney, Agent, or Firm* — Kevin W. Bieg; Mario A. Burgarello

(57) ABSTRACT

A high altitude electromagnetic pulse (HEMP) or solar-geomagnetic disturbance (GMD) can introduce geomagneti-cally-induced currents (GICs) flowing through grounded power transformers that have the potential to severely impact the operation of large-scale electric power grids. A top-down mitigation design strategy considers grid-wide dynamic behavior during an HEMP/GMD event and uses optimal control theory to determine the compensation signals required to protect critical grid assets. As examples, the approach is applied to both a standalone transformer system, small power 3- and 4-bus systems, and large-power 20-bus system.

10 Claims, 37 Drawing Sheets

Per-Phase Saturating Transformer

(56) References Cited

U.S. PATENT DOCUMENTS

2018/0226796 A1*  8/2018  Anderson  ............... H02J 3/01
2022/0254565 A1*  8/2022  Anderson  ............... H02H 7/04

OTHER PUBLICATIONS

Donnelly, T. J., et al., "Control Strategies for Large Power Transformer HEMP/GMD Protection," 2023 North American Power Symposium (NAPS), 2023, pp. 1-6.

Donnelly, T. J. et al., "Dynamic Model of a 20-Bus Power System for HEMP/GMD Controls-based Mitigation Design." 2023 North American Power Symposium (NAPS), 2023, pp. 1-6.

Donnelly, T. J. et al., "Top-Down Control Design Strategy for Electric Power Grid EMP (E3) Protection," 2023 IEEE Texas Power and Energy Conference (TPEC), College Station, TX, USA, 2023, pp. 1-6.

Kappenman, J. G. "GIC Mitigation: A Neutral Blocking/ Bypass Device to Prevent the Flow of GIC in Power Systems," IEEE Transactions on Power Delivery, 991 , vol. 6, p. 1271-1281.

Kovan, B. and De Leon, F., "Mitigation of Geomagnetically Induced Currents by Neutral Switching," IEEE Transactions on Power Delivery, 2015, vol. 30, pp. 1999-2006.

Lu, M. et al., "Optimal Transmission Line Switching Under Geomagnetic Disturbances," IEEE Transactions on Power Systems, 2018, vol. 33, pp. 2539-2550.

Naghshbandy, A. et al., "Blocking DC Flux due to Geomagnetically Induced Currents in the Power Network Transformers," The 34th International Power System Conference (PSC) 2019, pp. 772-776.

Nazir, M. and Enslin, J. H., "Converter-Based Solutions: Opening New Avenues of Power System Protection Against Solar and HEMP MHD-E3 GIC," IEEE Transactions on Power Delivery, 2021, vol. 36, pp. 2542-2549.

* cited by examiner

OPTIMAL CONTROL THEORY APPROACH FOR POWER GRID EMP PROTECTION

CROSS-REFERENCE TO RELATED APPLICATION

This application claims the benefit of U.S. Provisional Application No. 63/450,242, filed Mar. 6, 2023, which is incorporated herein by reference.

FEDERALLY SPONSORED RESEARCH AND DEVELOPMENT

This invention was made with Government support under Contract No. DE-NA0003525 awarded by the United States Department of Energy/National Nuclear Security Administration. The Government has certain rights in the invention.

STATEMENT REGARDING PRIOR DISCLOSURES BY THE INVENTOR OR A JOINT INVENTOR

The following disclosures are submitted under 35 U.S.C. 102 (b)(1)(A): Timothy J. Donnelly, David G. Wilson, Rush D. Robinett III, and Wayne W. Weaver, "Top-Down Control Design Strategy for Electric Power Grid EMP (E3) Protection," 2023 *IEEE Texas Power and Energy Conference (TPEC)*, College Station, TX, USA, 2023, pp. 1-6; Timothy J. Donnelly, David G. Wilson, Rush D. Robinett, and Wayne W. Weaver, "Control Strategies for Large Power Transformer HEMP/GMD Protection," 2023 *North American Power Symposium (NAPS)*, 2023, pp. 1-6; and Timothy J. Donnelly, David G. Wilson, Rush D. Robinett, and Wayne W. Weaver, "Dynamic Model of a 20-Bus Power System for HEMP/GMD Controls-based Mitigation Design," 2023 *North American Power Symposium (NAPS)*, 2023, pp. 1-6 The subject matter of these disclosures was conceived of or invented by the inventors named in this application.

BACKGROUND OF THE INVENTION

Today a variety of both natural and man-made high impact, low frequency (HILF) events threaten the reliable operation of the electric power grid. These events include such things as extreme weather, cyber-attacks, and coordinated physical disturbances. See M. Weiss, Energ. Sustain. Soc. 9, 18 (2019). In addition, there is growing concern regarding the threat to the electric power grid posed by high-altitude electromagnetic pulses (HEMPs) and solar-geomagnetic disturbances (GMDs). See M. Weiss, *Energ. Sustain. Soc.* 9, 18 (2019); H. M. Pennington et al., *Proc. IEEE* 109 (4), 315 (2021); R. Horton, "Perspectives on Protecting the Electric Grid from an Electromagnetic Pulse or Geomagnetic Disturbance," *Hearing of the U.S. Senate Homeland Security and Governmental Affairs Committee* (2019); EPRI, *Magnetohydrodynamic Electromagnetic Pulse Assessment of the Continental U.S. Electric Grid: Geomagnetically Induced Current and Transformer Thermal Analysis*, Palo Alto, CA (2017); and J. G. Kappenman, *IEEE Power Eng. Rev.* 16 (5), 5 (1996). During these geomagnetic events, changes in the earth's magnetic field (caused by a high-altitude nuclear explosion or charged particles from a coronal mass ejection colliding with the magnetosphere) result in time- and spatially-varying electromagnetic field at the earth's surface. Power grid equipment, which is dispersed across large geographic areas and interconnected with long transmission lines, becomes susceptible to these slowly varying fields.

One major concern during a HEMP/GMD event is the unintended introduction of geomagnetically-induced currents (GICs) flowing through grounded power transformers. These currents tend to be much lower in frequency than the 50/60 Hz ac currents that transformers are designed to handle, and as such they can introduce a magnetic flux offset in the core of the device and cause the transformer to become saturated. This saturation significantly deteriorates the performance of the transformer, leading to distorted ac waveforms, increased losses, and the potential for thermal damage. See EPRI, *Magnetohydrodynamic Electromagnetic Pulse Assessment of the Continental U.S. Electric Grid: Geomagnetically Induced Current and Transformer Thermal Analysis*, Palo Alto, CA (2017); J. G. Kappenman, *IEEE Power Eng. Rev.* 16 (5), 5 (1996); and X. Dong et al., "Comparative analysis of exciting current harmonics and reactive power consumption from GIC saturated transformers," 2001 *IEEE Power Engineering Society Winter Meeting*, vol. 1, pp. 318-322 (2001). It is also possible that system cascading failures may occur because of compounding effects. See Meta-R-321, *The Late-Time (E3) High-Altitude Electromagnetic Pulse (HEMP) and Its Impact on the U.S. Power Grid*, January 2010.

To date, several approaches for minimizing the impact of GICs on power system operation have been investigated, including passive and active neutral-path blocking devices (BDs). See J. Kappenman et al., *IEEE Trans. Power Deliv.* 6 (3), 1271 (1991); L. Bolduc et al., *IEEE Trans. Power Deliv.* 20 (1), 163 (2005); and B. Kovan and F. de León, *IEEE Trans. Power Deliv.* 30 (4), 1999 (2015); and M. Nazir et al., *IEEE Trans. Power Deliv.* 36 (4), 2542 (2021). These devices disrupt the flow of GICs by introducing an impedance in the grounded transformer neutral conductor. Recently, a flux-blocking device (FBD) has also been put forth in which an opposing current is injected into the transformer through a tertiary winding so as to compensate for the effects of GICs without breaking the neutral path. See H. Naghshbandy et al., "Blocking DC Flux due to Geomagnetically Induced Currents in the Power Network Transformers," 2019 *International Power System Conference (PSC)*, pp. 772-776, (2019). Although implementing such a strategy may be practically more challenging, a purported benefit is to decrease the likelihood of GIC shifting—a term used to describe when the installation of HEMP/GMD equipment at one substation exacerbates the field/currents experienced at neighboring substations. See M. Lu et al., *IEEE Trans. Power Syst.* 33 (3), 2539 (2018).

SUMMARY OF THE INVENTION

The present invention is directed to an electric power grid, comprising at least one transformer comprising a transformer core and a transformer neutral, wherein a low frequency current pulse generates a magnetizing flux in the transformer core; and at least one of a blocking device comprising a voltage source providing a neutral-path control signal between the transformer neutral and ground; and a flux-blocking device comprising a current source providing a magnetizing-path control signal to the transformer core; wherein the neutral-path control signal and the magnetizing-path control signal are optimized to keep the magnetizing flux below a saturation limit in response to the low frequency current pulse. The low frequency current pulse can comprise a geomagnetically-induced current having a frequency of less than 1 Hz. The blocking device can comprise a linear quadratic regulator, an optimized controller based on the saturation limit, or a blocking capacitor. The at least transformer can comprise a generator transformer and at least one load transformer, wherein a low-frequency electromagnetic pulse is coupled to a transmission line connecting the generator transformer to the at least one load transformer. The at least one load transformer can comprise two or more load transformers in parallel and wherein each of the load transformers has a separate blocking device and/or flux-blocking device providing a separate neutral-path control signal and/or magnetizing-path control signal for each of the load transformers. The at least one load transformer comprises two or more load transformers in parallel and wherein a neutral-path control signal and/or magnetizing-path control signal from one of the load transformers is optimized to minimize transformer saturation at a system-level.

The invention provides a controls-based mitigation approach for protecting large power transformers from the impacts of a HEMP/GMD event. As examples of the invention, an optimal control theory approach was demonstrated on a standalone transformer system and a small, three-bus power system, a four-bus power system, and a twenty-bus power system. Both neutral blocking mitigation and flux blocking mitigation approaches were considered, and controllability/linear analysis tools were used to understand the relative performance of each. These results were then used along with an optimal control formulation to study the protection of the various grid configurations. Overall, the two approaches are shown to complement each other and enable practical grid protection schemes.

BRIEF DESCRIPTION OF THE DRAWINGS

The detailed description will refer to the following drawings, wherein like elements are referred to by like numbers.

FIG. 23A compares bus voltages. FIG. 23B compares substation ground currents.

FIG. 24A shows the line current between substations 5 and 7, which is impacted by the presence of a GIC blocking device (BD). FIG. 24B shows the line current between substations 5 and 6.

FIG. 25A shows the large predicted magnitudes associated with dc and linear dynamic models. FIG. 25B shows magnetizing flux zoomed to highlight expected behavior when saturation dynamics are included.

DETAILED DESCRIPTION OF THE INVENTION

The present invention is directed to a new top-down control theory approach for evaluation and designing HEMP/GMD mitigation strategies. Instead of focusing on specific mitigation technologies (e.g., blocking capacitors), the top-down approach generalizes the problem and formulates the task of mitigating the impact of a HEMP event as an optimal control design challenge. This enables the established techniques from optimal control theory to be applied, and also serves as a systematic foundation for evaluating and designing mitigation schemes. This top-down approach can provide new insights/strategies to help mitigate the HEMP threat, and the resulting optimal control solutions can drive practical design specifications for future grid applications.

Transformer Model and Optimal Control Formulation

Saturating Transformer Model

Figure 1:
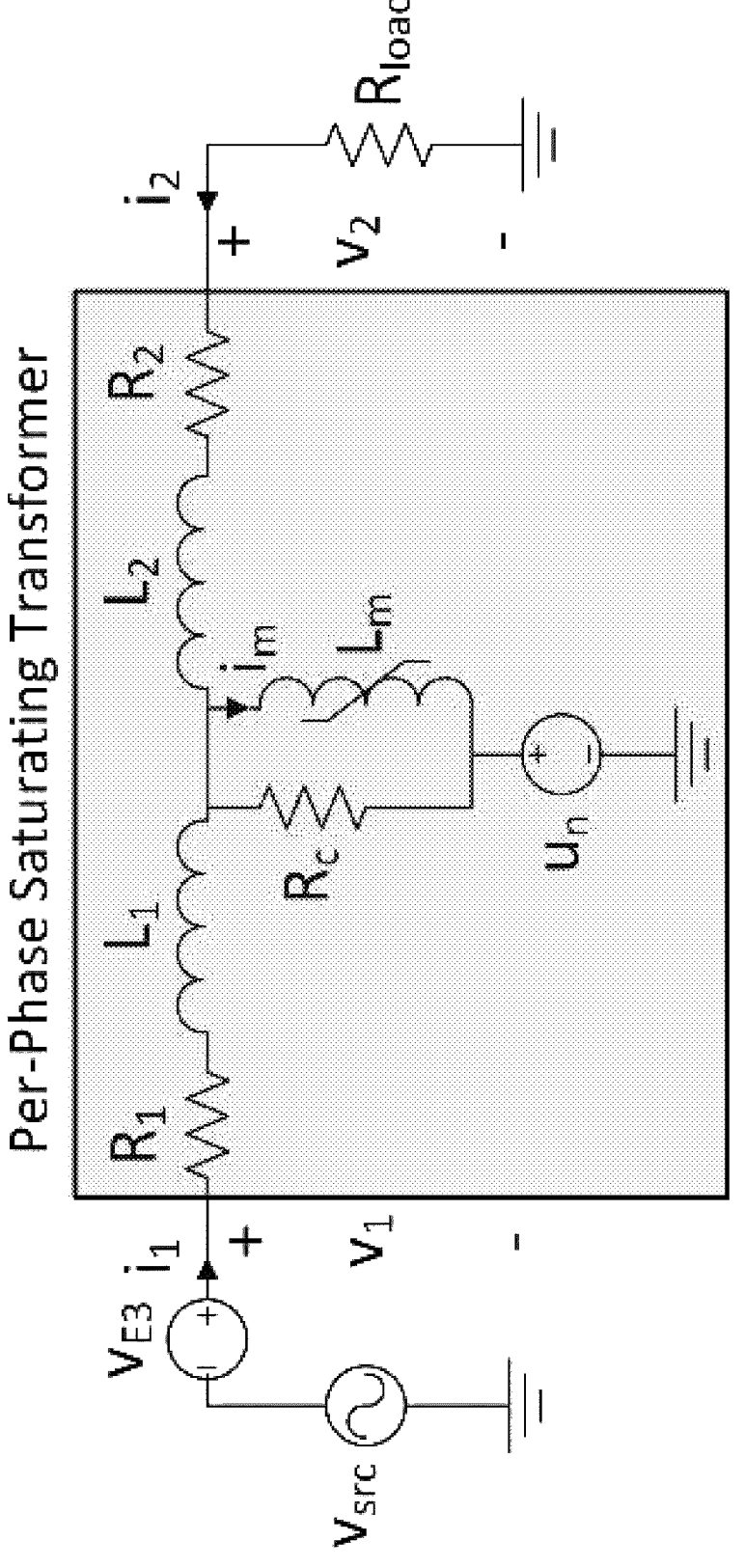
FIG. 1 is a circuit diagram for a standalone transformer system, including primary side sources, T-equivalent saturating transformer, and secondary-side load.
Figure 2:
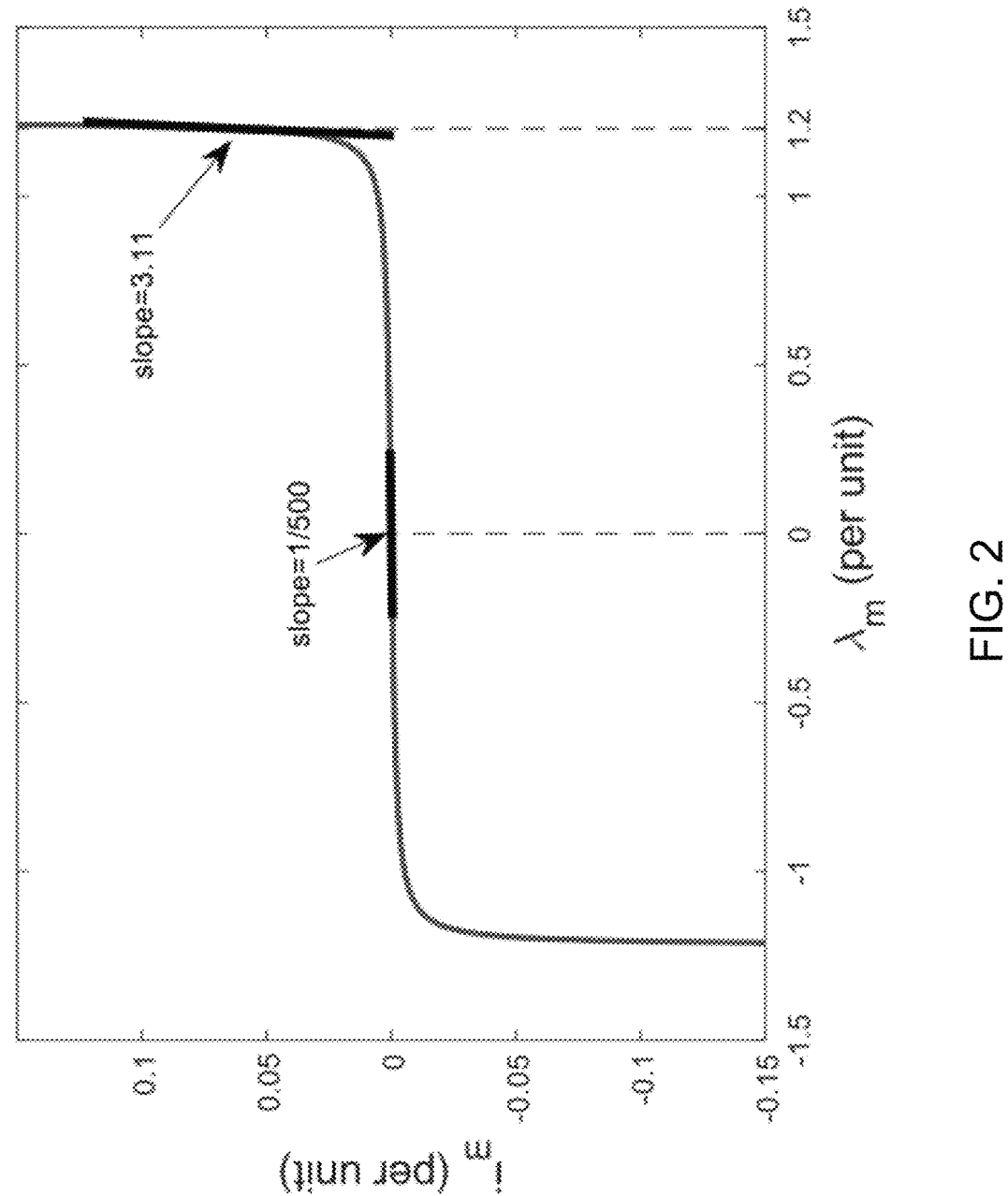
FIG. 2 is a graph of a transformer saturation curve based on the tangent function.

The nonlinear saturating transformer model is illustrated in FIG. 1. Therein, the components $R_1$, $R_2$, $L_1$, and $L_2$ correspond to the primary- and secondary-side winding resistances and leakage inductances, respectively. The core of the device is modeled by a nonlinear magnetizing inductance, $L_m$, and core losses are accounted for by the resistor $R_c$. Finally, a voltage source $u_n$ represents an added component that sits between the transformer neutral and ground. This voltage source can represent a grounded neutral ($u_n = 0$), a neutral blocking capacitor ($\dot{u}_n = (i_1 + i_2)/C_b$), or more generally any desired control signal. Overall, the transformer model is defined by the dynamic equations given in Eq. (1)

$$L_1 \dot{i}_1(t) = -(R_1 + R_c)i_1 - R_c(i_2 + i_m) + v_1 - u_n \quad (1)$$

$$L_2 \dot{i}_2(t) = -(R_2 + R_c)i_2 - R_c(i_1 + i_m) + v_2 - u_n$$

$$\dot{\lambda}_m(t) = R_c(i_1 + i_2 - i_m)$$

which can be written as $\dot{x}(t) = f(x(t), u(t))$, where $x = [i_1, i_2, \lambda_m]$ and $u = u_n$. To use Eq. (1), an additional algebraic equation that defines the relationship between the magnetizing current, $i_m$, and the magnetizing flux linkage, $\lambda_m$, is also needed. Here, a tangent function was used as a simple approximation to an anhysteretic B-H curve:

$$i_m = k_1 \tan(k_2 \lambda_m) \quad (2)$$

where $k_1$ and $k_2$ are user selected constants. A plot of Eq. (2) is shown in FIG. 2 and it is noted that $k_1$ and $k_2$ were selected to match the piecewise-linear inductance provided in the MathWorks model for a saturable transformer at the two points where the slope is indicated. See MathWorks/Simulink Specialized Power System Documentation: "Saturable Transformer", available at mathworks.com/help/sps/powersys/ref/saturabletransformer.html. The transformer parameters are listed in Table I.

TABLE I

| Transformer Parameters | |
| --- | --- |
| Parameter | Value (per unit) |
| $R_1$, $R_2$ | 0.2% |
| $L_1$, $L_2$ | 8% |
| $R_c$, $R_{load}$ | 500, 1 |
| $k_1$, $k_2$ | 0.0016, 1.2879 |

Optimal Control Formulation

Optimal control theory is broadly concerned with finding a control/input signal, u(t), which drives a dynamic system in such a way that as it evolves over time, a user defined objective function (or cost function) is minimized. The optimal control formulation is given in Eq. (3). Therein, the objective function, J, is shown in a general form of a running cost in which a function of the state and/or control variables, F, is integrated over time. The system dynamics $\dot{x}(t) = f(\bullet)$ in this case correspond to the transformer or grid dynamics, and the control signal u corresponds to the injected neutral voltage. Lastly, an optimal control problem may also include path constraints, which places bounds on the state and/or control signals. These path constraints are included in Eq. (3) via the two-sided inequality around $g(\bullet)$:

$$\min_{x(t), u(t)} J = \int_{t_0}^{t_f} F(x(t), u(t)) dt \quad (3)$$

such that, $$\dot{x}(t) = f(x(t), u(t))$$

$$lb \leq g(x(t), u(t)) \leq ub$$

It is noted that there are numerous methods to solve optimal control problems—including analytical solutions which are tractable for certain classes of problems—and a variety of numerical methods, which are more broadly applicable. See J. T. Betts, *Practical Methods for Optimal Control and Estimation Using Nonlinear Programming*, Second Edition, SIAM (2010). Several different variations of Eq. (3) are considered herein, but the most general form which includes nonlinear dynamic equations and path constraints is solved numerically using direct collocation techniques. Direct collocation algorithms discretize the system dynamics, path constraints, and objective function and turn Eq. (3) into a standard mathematical optimization problem. The third-party MATLAB package optim Traj was used to perform the direct collocation, and to improve performance the software was modified to use the IPOPT interior-point solver. See M. Kelly, *SIAM Review* 59(4), 849 (2017); A. Wachter and L. T. Biegler, *Math. Program.* 106(1), 25 (2006); and E. Bertolazzi, mexIPOPT (2022), available at https://github.com/ebertolazzi/mexIPOPT.

Example: Standalone Transformer

As an initial example of applying optimal control theory to the study of EMP grid resilience, the standalone transformer system shown FIG. 1 is considered. The transformer in this system is supplied on the primary side by two voltage sources, $V_{src}$ and $V_{E3}$. They represent a 60 Hz ac signal and a simulated EMP pulse, respectively. The secondary side of the transformer is terminated with a fixed resistance, $R_{load}$.

Figure 3:
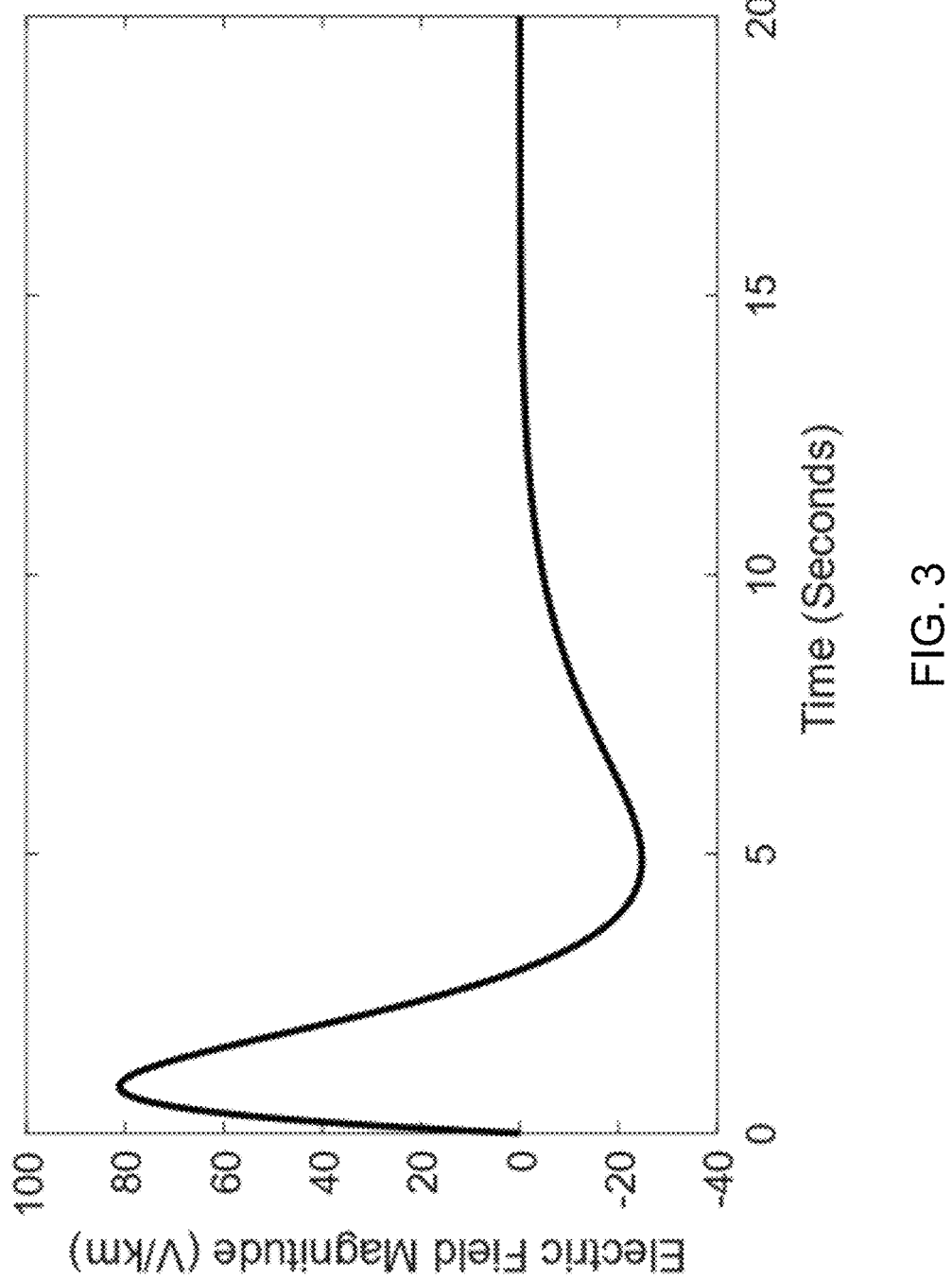
FIG. 3 is a graph of the Department of Energy E3a "Blast" waveform.

An EMP pulse is typically described as having three distinct phases: E1, E2, and E3 which are differentiated based on how the electric-field magnitude and rate-of-change varies over time. The E3 component is the longest lasting (on the order of seconds to minutes), and thus is the most impactful in terms of generating GICs. The E3 component itself is also sometimes subdivided into the blast (E3a) and heave (E3b) components. Although both components could be incorporated into the optimal design strategy, only the E3a component is considered in this example for brevity. The characteristics of the E3a waveform are provided in a DOE memo and a reproduced illustration of the waveform is shown in FIG. 3. See Department of Energy (DOE), "Physical Characteristics of HEMP Waveform Benchmarks for Use in Assessing Susceptibilities of the Power Grid, Electrical Infrastructures, and Other Critical Infrastructure to HEMP Insults," Jan. 21, 2021.

Conventional Mitigation Strategies

Figure 4:
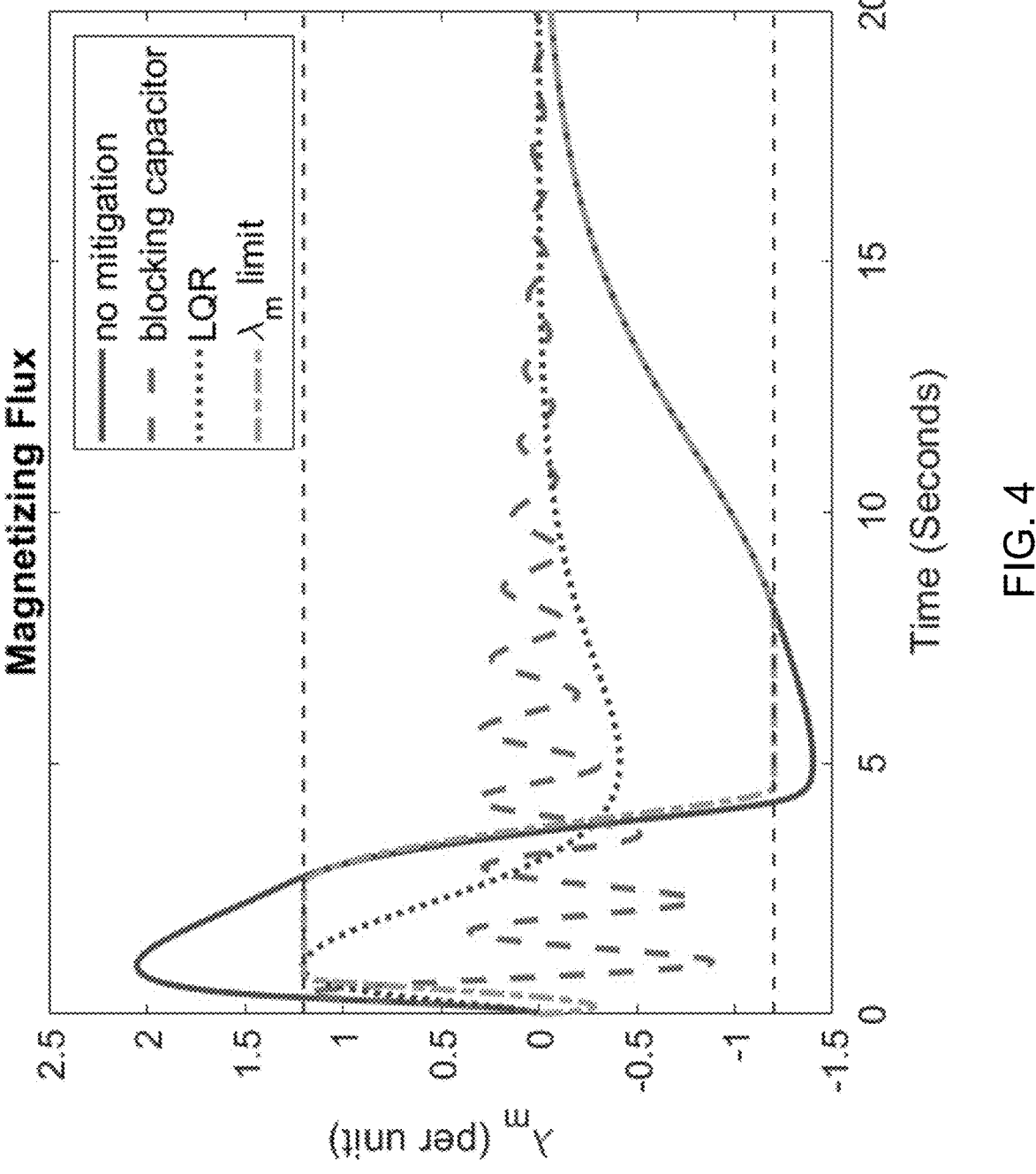
FIG. 4 is a graph of transformer magnetizing flux response to an E3a pulse using several mitigation schemes.

To study the behavior of the standalone transformer in response to the E3a impulse, the system was simulated over a 20 second time interval. Initially, the system was simulated with no control mitigation ($u_n=0$) and no ac component ($V_{src}=0$). The behavior of the magnetizing flux in the core of the transformer during this interval is shown in FIG. 4 (labeled: no mitigation). In this case, it is observed that the E3a pulse pushes the transformer well into saturation. For reference, the 1.2 per unit (p.u.) saturation level is indicated in FIG. 4 with horizontal dashed lines.

Figure 5:
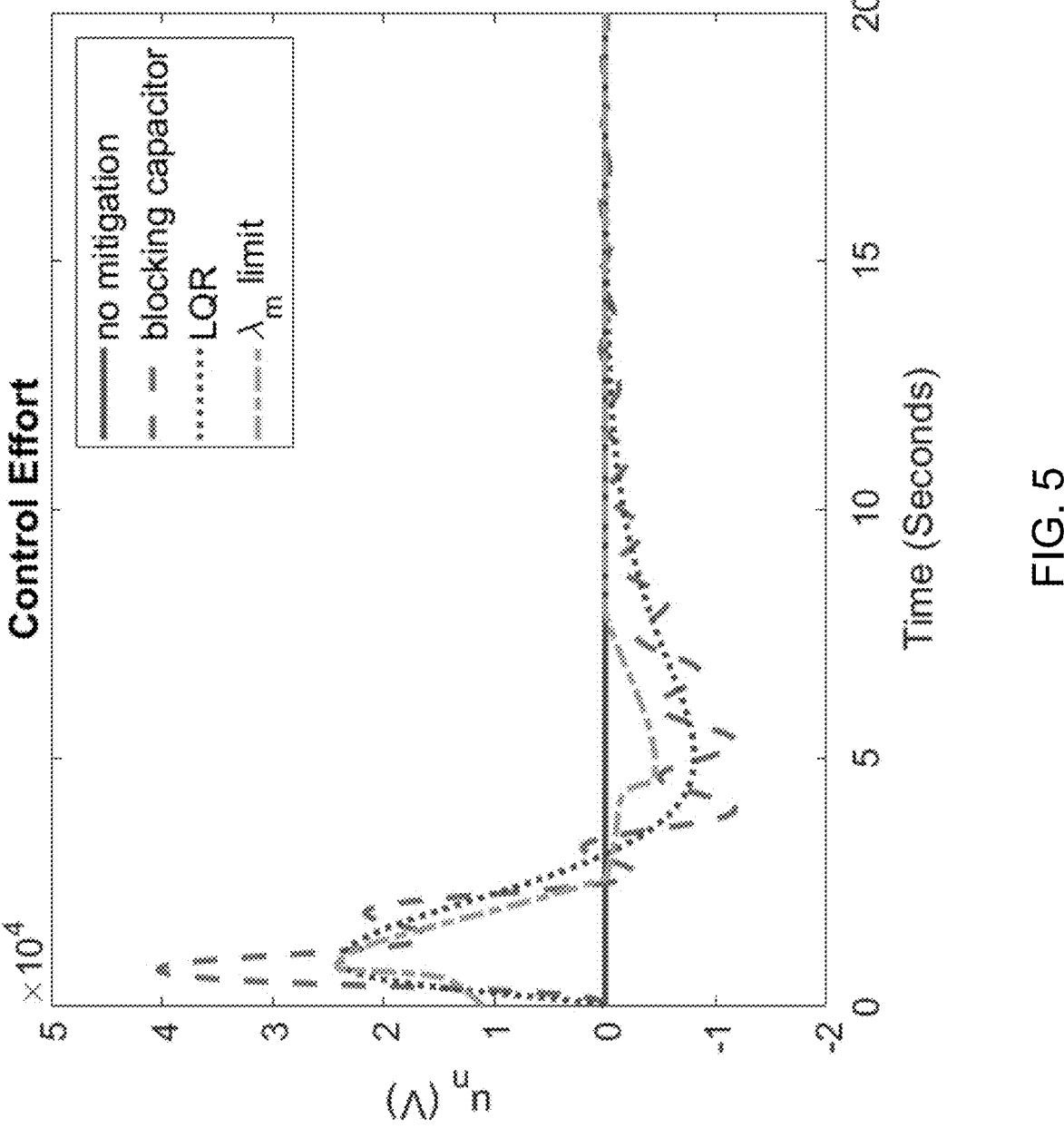
FIG. 5 is a graph of control voltage injected into the transformer neutral for the several mitigation schemes.

To compare with the $u_n=0$ study, a neutral blocking capacitor study was also conducted. The neutral blocking capacitor was added to the simulation by including the ordinary differential equation (ODE):

$$\dot{u}_n = \frac{(i_1 + i_2)}{C_b}$$

where $C_b$ was selected to be $1\Omega$ at 60 Hz (2.65 mF). See T. J. Overbye et al., "Power Grid Geomagnetic Disturbance (GMD) Modeling with Transformer Neutral Blocking and Live Grid Testing Results," (2013). The results of this study are also shown in FIG. 4 (labeled: blocking capacitor). The blocking capacitor generally does a suitable job at preventing the transformer from becoming severely saturated, although saturation does occur up to the 1.2 p.u. level indicated. The control signal $u_n$ (in this case, the blocking capacitor voltage) is shown in FIG. 5.

Optimal Mitigation Strategies

Two additional mitigation studies of the standalone transformer system were conducted. These studies used optimal control techniques to shape the behavior of the transformer in response to the E3a impulse. The first optimal controller considered was a linear quadratic regulator (LQR). The LQR uses feedback in the form:

$$u_n = -Kx$$

and provides an optimal solution to Eq. (3), assuming the system dynamics are linear, the cost function is a quadratic, and no path constraints are present. A cost function $$F = \lambda_m^2 + \beta u_n^2$$

was assumed. The MATLAB function lqr was used to determine the gain K, and the state-feedback controller was incorporated into the nonlinear dynamic simulation. The resulting magnetizing flux and control signal are shown in FIGS. 4 and 5, respectively (labeled: LQR). The cost function parameter $\beta$ was adjusted so that the peak magnetizing flux matched the case for the blocking capacitor. Overall, the LQR smoothly recovers to the E3a impulse.

Finally, the more general optimal control problem Eq. (3)—which can directly account for nonlinear dynamics and include path constraints—was solved for the standalone transformer system. The problem was formulated to limit transformer magnetizing flux to between ±1.2 p.u., while doing so with minimal control effort: i.e., $$-1.2 \le g = \lambda_m \le 1.2, F = u_n^2.$$

The resulting magnetizing flux $\lambda_m$ and control signal $u_n$ for the optimal solution are shown in FIGS. 4 and 5, respectively (labeled: $\lambda_m$ limit). It is noted that the solution specifies $u_n$ at time t=0 to be a positive/non-zero value. This drives the magnetizing flux negative initially, and thus preemptively counter acts the E3a impulse. Throughout the rest of the interval, the magnetizing flux is minimally controlled and thus runs into both the positive and negative saturation limits as the E3a pulse passes.

Standalone Transformer with AC Component

Figure 6:
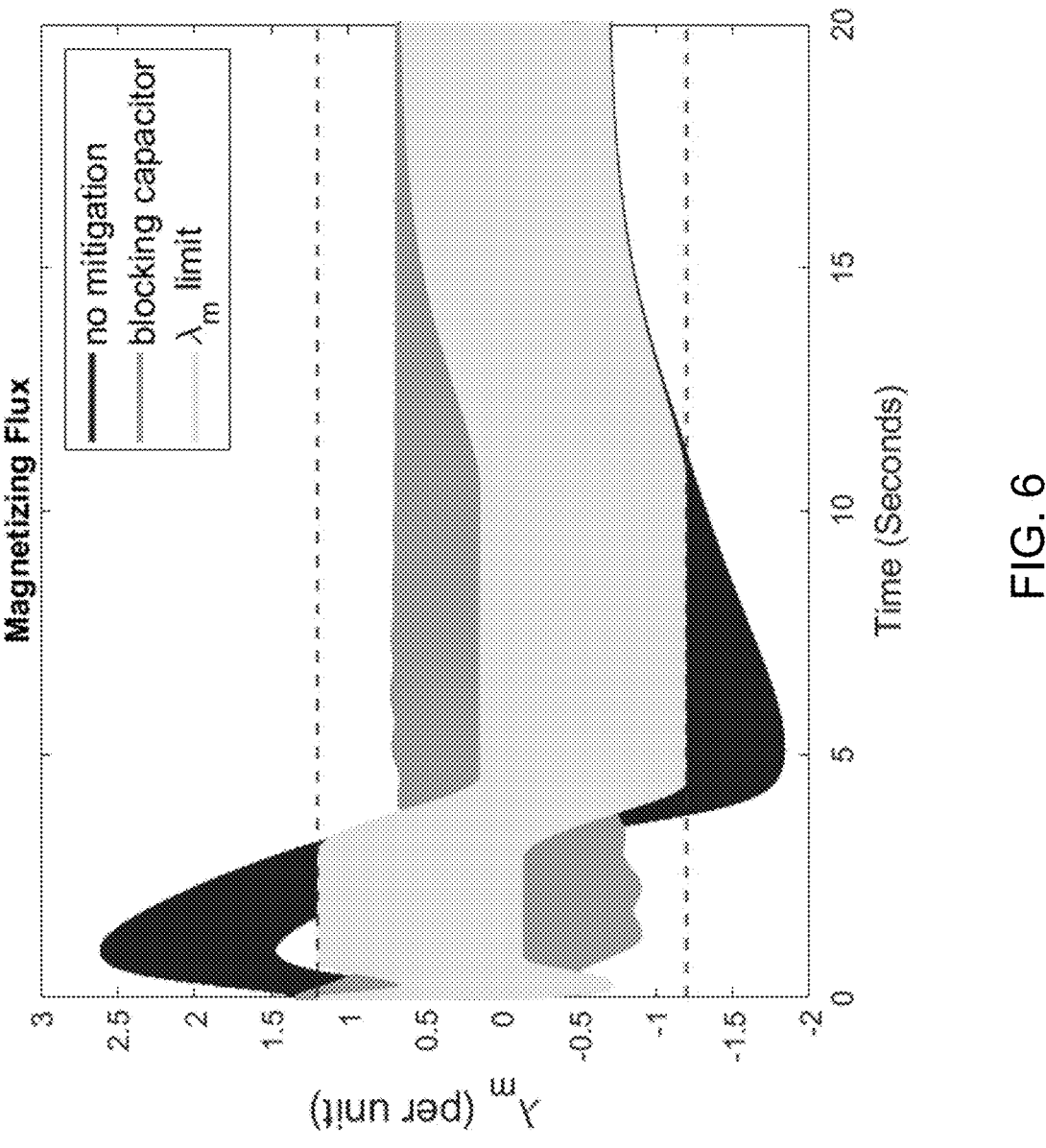
FIG. 6 is a graph of transformer flux (60 Hz+E3a) for a standalone transformer with an ac component.

The standalone transformer case was studied with the inclusion of the 60 Hz ac component ($V_{src}=1$ p.u.) in addition to the E3a impulse. The resulting magnetizing flux for the transformer is shown in FIG. 6, which shows the case for: no mitigation, blocking capacitor, and optimal controller based on $\lambda_m$ limits. It is clear from FIG. 6 that both the blocking capacitor and $\lambda_m$ limit controller do a suitable job of preventing transformer saturation (the brief saturation in the blocking capacitor case at the start of the interval is due to the initialization of the ODE solver, not the E3a impulse).

Figure 7:
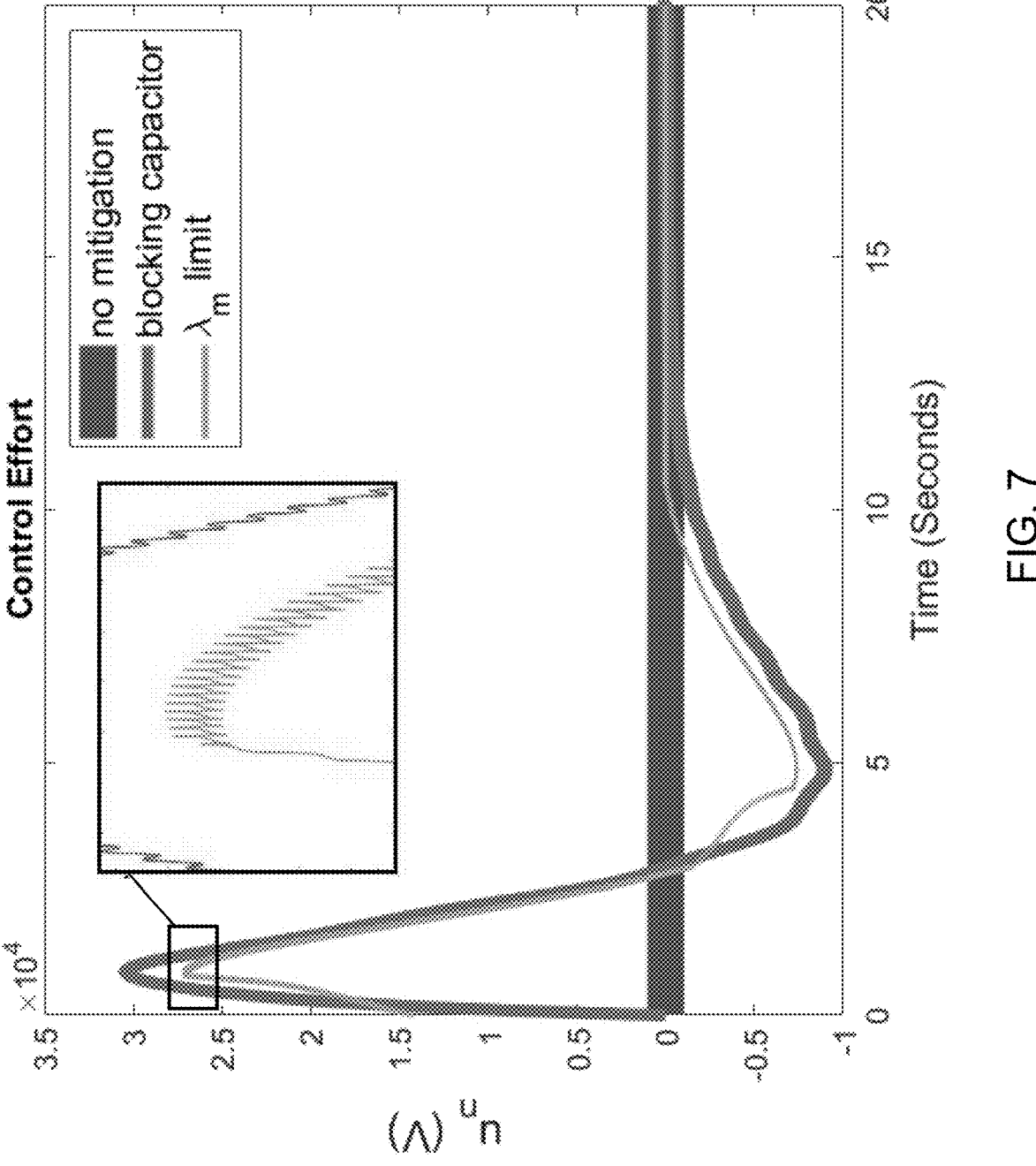
FIG. 7 is a graph of control voltage (with zoomed subplot showing 60 Hz response).

The control effort required to obtain this response is shown in FIG. 7. These results are similar to the results for the standalone transformer without the ac component, the primary difference between the two can be seen in the zoomed in subplot in FIG. 7. This shows the control effort near the peak of the E3a response, and instead of being a smooth function, the controller is seen to increase sharply during the parts of 60 Hz cycle where the ac component and E3a component work together to push the transformer outside saturation limits, and then falls rapidly (due to minimum control effort objective) as the 60 Hz component enters the part of the cycle that works against the E3a component.

Overall, it was found for the inclusion of the 60 Hz component for the standalone transformer case study did not have an outsized impact on the behavior of the optimal control results. Nevertheless, the generation of harmonics due to transformer saturation plays a key role in the degradation of grid resilience during a HEMP/event. See X. Dong et al., "Comparative analysis of exciting current harmonics and reactive power consumption from GIC saturated transformers," 2001 *IEEE Power Engineering Society Winter Meeting*, pp. 318-322 (2001). Thus, it is possible that 60 Hz effects may play a more important role in different grid situations, and its inclusion here within the top-down optimal control framework serves as a useful demonstration.

Example: Small Power System

Figure 8:
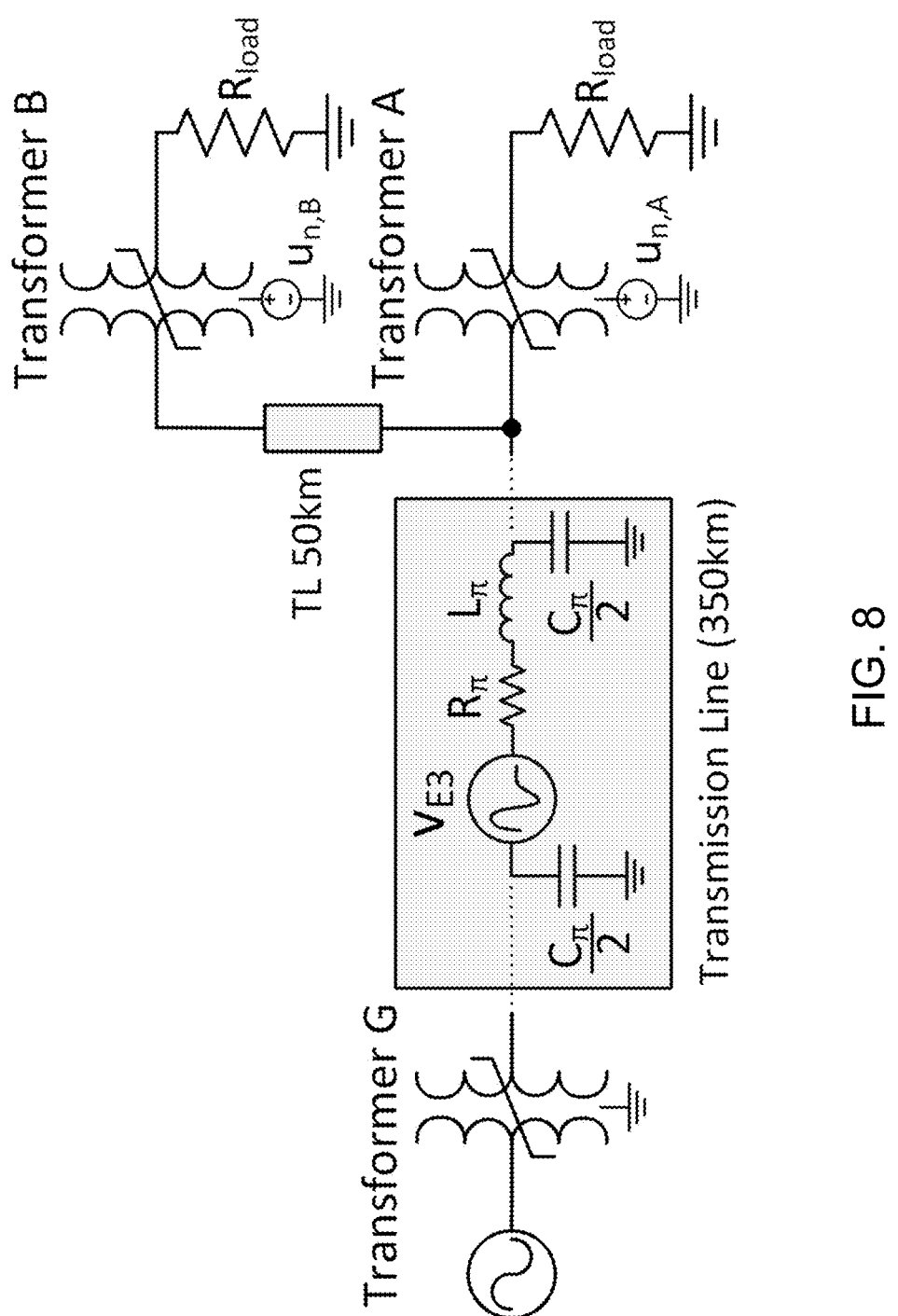
FIG. 8 is a circuit diagram for a small-scale power grid model with a simulated EMP insult.

The standalone transformer system considered above provides a useful demonstration of the top-down HEMP/E3 mitigation strategy. However, further insights can be obtained by considering a slightly more involved grid configuration. A single-line diagram of an exemplary 3-bus power system is shown in FIG. 8. The system consists of a generator/step-up transformer (Transformer G), a long (350 km) transmission line, and two parallel load transformers. The two load transformers are labeled Transformer A and B, respectively, and are separated by a short 50 km transmission line. The same saturating transformer model considered above is used here for all three transformers.

The simulated effects of a HEMP event are incorporated into the grid by embedding the E3a voltage source (FIG. 3) in the transmission line model. For simplicity, it is assumed that the EMP has an east-west orientation and only couples to the long transmission line. Pi-equivalent circuits are used to model the transmission lines, and the parameters are listed in Table II.

TABLE II

| Transmission Line Parameters | |
| --- | --- |
| Parameter | Value |
| $R_\pi$ | 0.01273 $\Omega$/km |
| $L_\pi$ | 0.9337 mH/km |
| $C_\pi$ | 12.47 nF/km |

Dual Transformer Protection

Figure 9A:
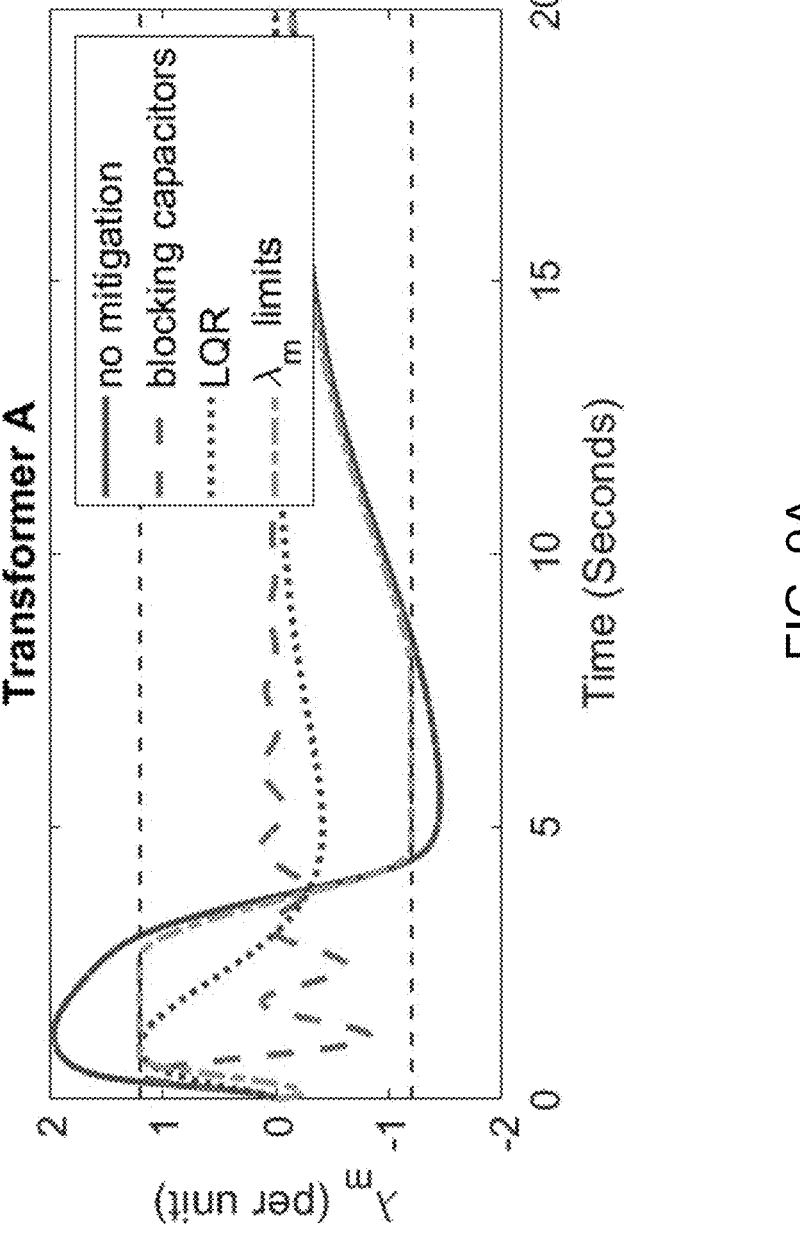
FIGS. 9A and 9B are graphs of small-power grid transformer magnetizing flux response to a simulated E3a pulse using several mitigation schemes for Transformers A and B, respectively.
Figure 9B:
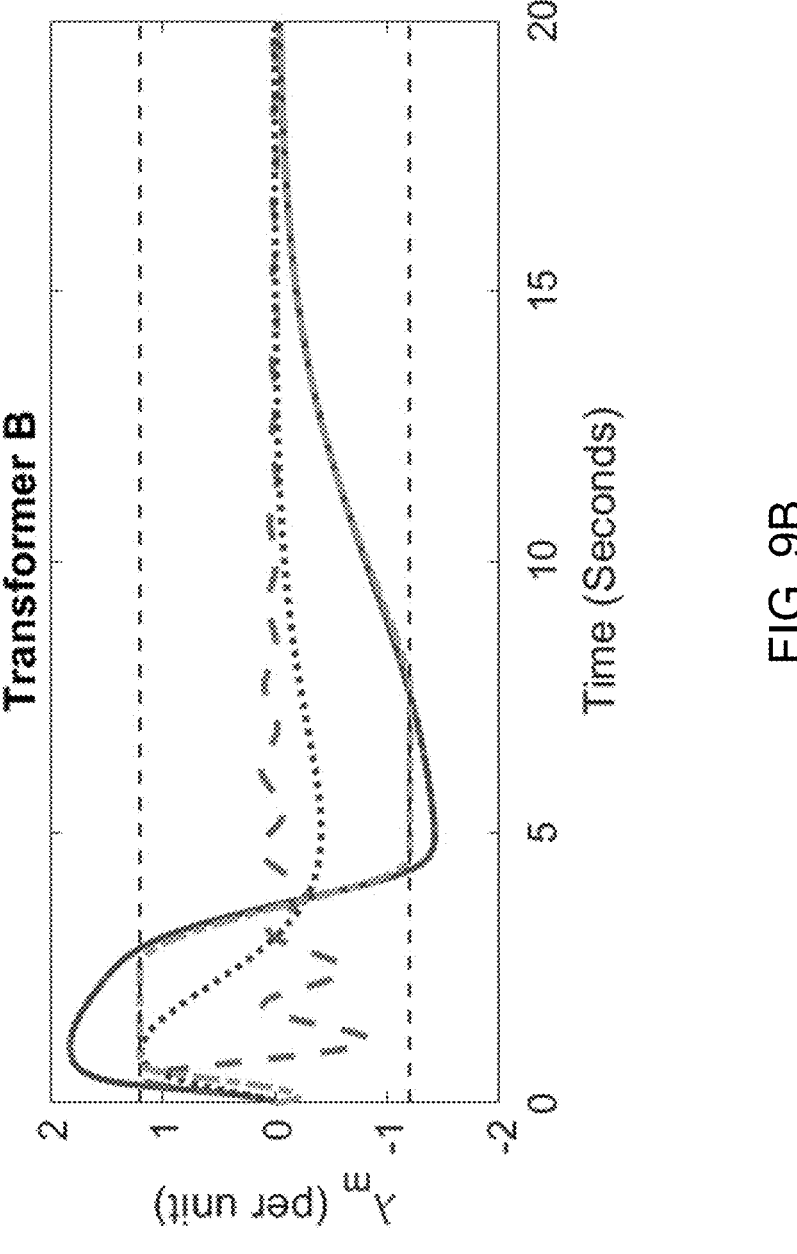
Figure 10:
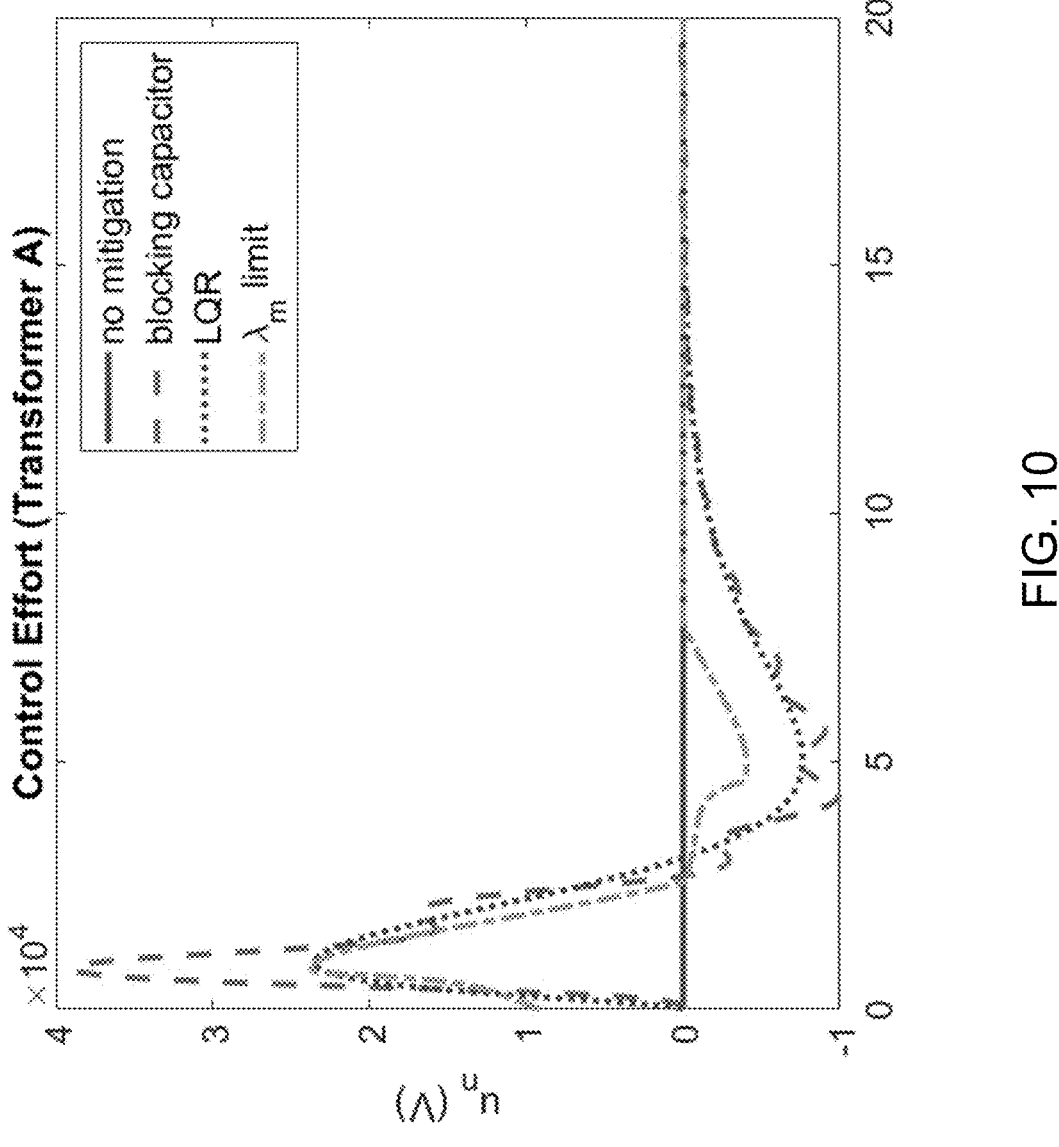
FIG. 10 is a graph of control voltage injected in Transformer A neutral (only $u_{n,A}$ is shown for brevity, $u_{n,B}$ similar).

The analysis of the 3-bus power system begins with a simulation and optimal control study in which both load transformers (A and B) are equipped with an EMP mitigation control input. FIGS. 9A, 9B, and 10 show the magnetizing flux and control signals, respectively. Within these, four cases were considered: no mitigation, blocking capacitors, LQR, and optimal controllers based on path constraints ($\lambda_m$ limits).

Overall, it is noted that the 3-bus system behaves similarly to the standalone transformer system. As with the standalone system, with no mitigation in place the E3a pulse pushes the unprotected transformers well into saturation. Likewise, with the blocking capacitors in place, the magnetizing flux is limited to approximately 1.2 p.u. The primary difference between the two blocking capacitor studies is that the response is slightly more damped in the 3-bus system compared to the single transformer system, likely due to circuit topology and the added resistance introduced by the transmission lines.

The primary difference between the 3-bus system and standalone system as far as the optimal control formulation is concerned is that the control signal now has two components: a separate $u_n$ for each load transformer (i.e., $u=[u_{n,A} \ u_{n,B}]$). The objective function and path constraints were modified to account for the added control signal dimension, but overall the same strategy was utilized. Both optimal controllers (LQR and $\lambda_m$ limits) behave in a similar way to the standalone transformer study.

Single Transformer Protection

Figure 11A:
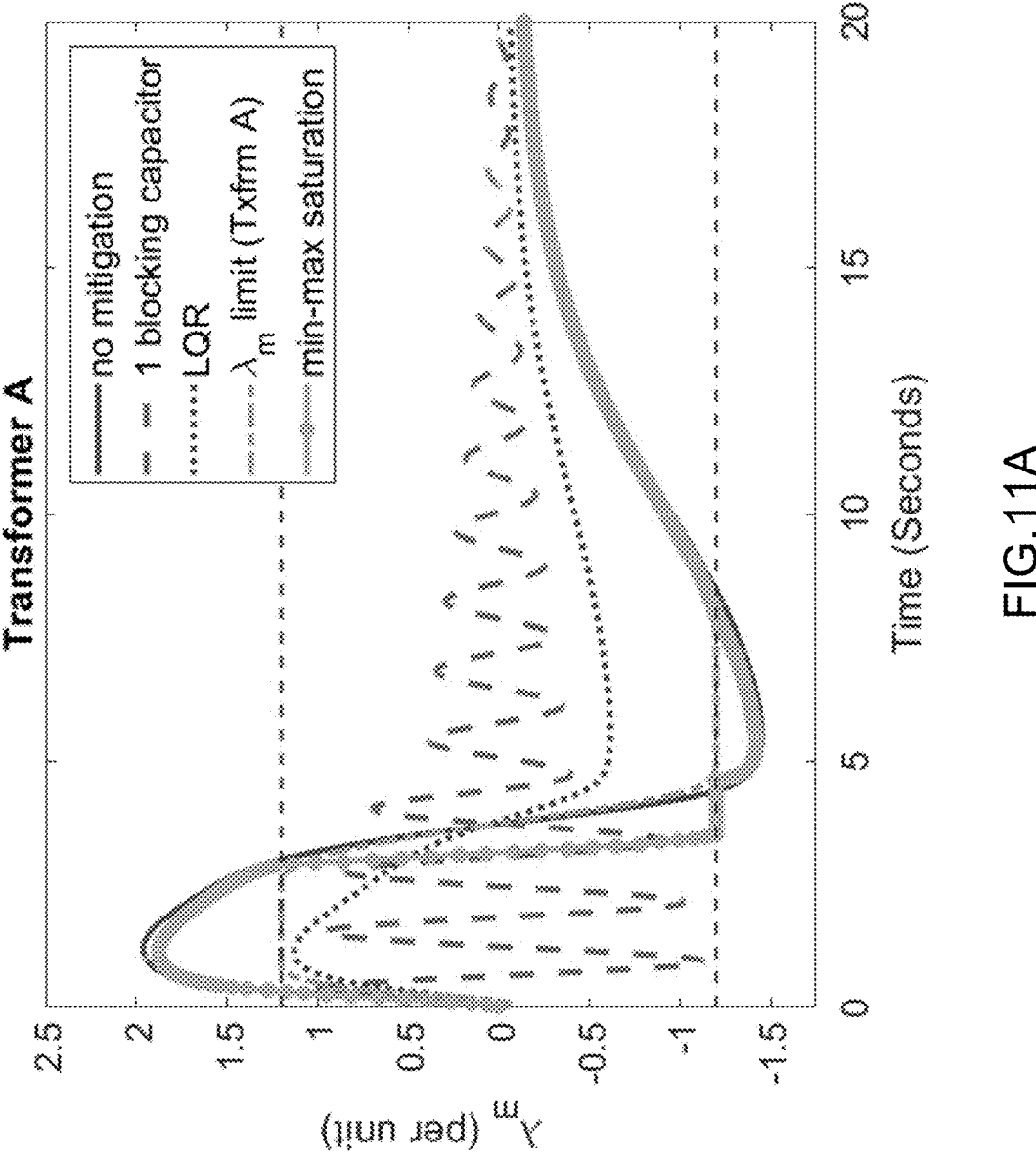
FIGS. 11A and 11B are graphs of power grid response to an E3a pulse when only one of the two parallel load transformers is equipped with a neutral voltage controller, for Transformers A and B, respectively.
Figure 11B:
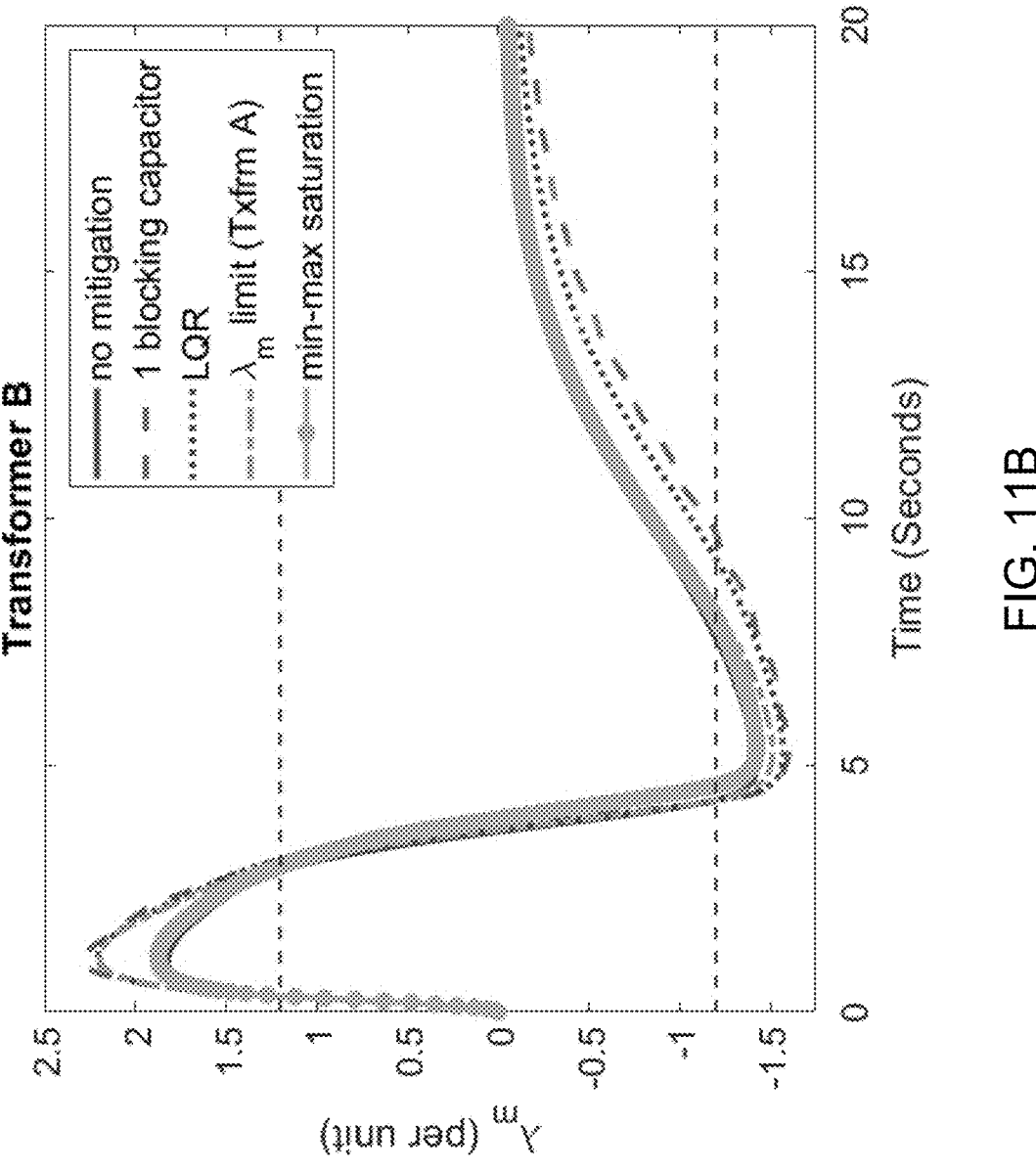
Figure 12:
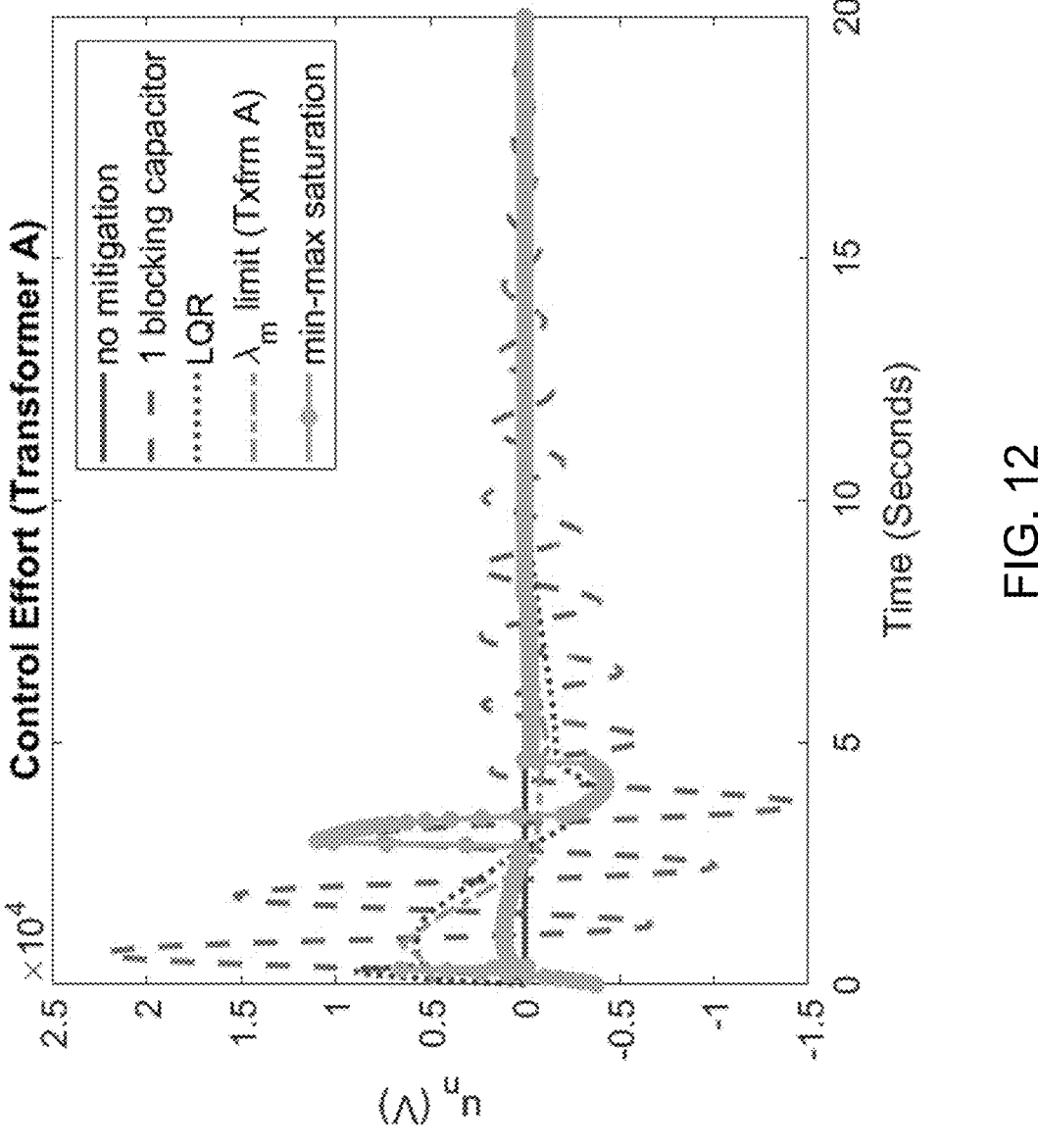
FIG. 12 is a graph of control voltage injected in Transformer A neutral (Transformer B neutral tied directly to ground).

A concern that has been raised in the literature regarding transformer HEMP/GMD protection is the issue that protecting only a subset of transformers in a system might cause the incident wave at unprotected transformers to be exacerbated. See Meta-R-321, "The Late-Time (E3) High-Altitude Electromagnetic Pulse (HEMP) and Its Impact on the U.S. Power Grid", January 2010. This phenomenon has been termed "GIC shifting," and is fundamentally due to current finding the path of least impedance. See A. H. Etemadi and A. Rezaei-Zare, *IEEE Trans. Power Syst.* 29(6), 2753 (2014). This scenario is studied for the 3-bus system shown in Eq. (3) by enforcing $u_{n,B}=0$ and only considering the impact that $u_{n,A}$ has. The same four mitigation strategies considered for the dual transformer protection are considered here; FIGS. 11A, 11B, and 12 show the results for: no mitigation, one blocking capacitor, LQR, and an optimal controller based on strict $\lambda_m$ limits. A fourth optimal controller (labeled: min-max saturation) was also considered.

The results for the no mitigation study are unchanged from dual transformer protection. However, with a single blocking capacitor located at Transformer A, and no mitigation at Transformer B, the GIC shifting issue is observed: the capacitor does an acceptable job of limiting saturation in Transformer A, but at the cost of saturating Transformer B even more than the base-case study (up to approximately 2.3 p.u., vs. 1.8 p.u. for the no mitigation study) as shown in FIG. 11B.

Likewise, the LQR controller and optimal controller based on $\lambda_m$ limits also suffer from GIC shifting. For the LQR controller, an objective function $$F = \lambda_{m,A}^2 + \lambda_{m,B}^2 + \beta u_n^2$$

was used where $\lambda_{m,A}$, $\lambda_{m,B}$ correspond to the magnetizing flux in Transformers A and B, respectively. Linear analysis of the system dynamics reveals that the system is not controllable with only one control input ($u=u_{n,A}$), thus even with a negligible penalty on control effort ($\beta=10^{-9}$), Transformer B is still pushed into a severe saturation regime. The optimal controller based on $\lambda_m$ limits behaves similarly: the magnitude of Transformer A's magnetizing flux is maintained at or below 1.2 p.u., but Transformer B's flux is pushed deeper into saturation than the no mitigation study (~2.2 p.u. vs. 1.8 p.u., respectively).

To alleviate the GIC shifting phenomenon, a fourth controller can be used with an alternative objective function. The new objective function is based on the idea of minimizing the max saturation experienced at either load transformer at each point in time over the E3a interval. The resulting total "max saturation area" (m.s.a.) is defined as in Eq. (4), which it is noted calculates a nonzero incremental area based on the greater between each transformer's magnetizing flux ($\lambda_m$) and a user defined flux threshold ($\lambda_{sat}$), for intervals in which either of the transformer's flux is greater than its corresponding threshold.

$$m.s.a. = \int \max(|\lambda_{mA}| - \lambda_{sat,A}, |\lambda_{m,B}| - \lambda_{sat,B}, 0)dt \tag{4}$$

This objective function is demonstrated for the 3-bus system by incorporating Eq. (4) as the objective function in Eq. (3). Since the objective function must be a smooth continuous function, the maximum function is reformulated by introducing a dummy variable, $u_t$, and minimizing $u_t$ under the constraint that it must be greater than each of the original arguments of the max function. The full form of the optimal control problem is given by:

$$\min_{x(t),u(t)} \int_{t_0}^{t_f} u_t + \beta u_{n,A}^2 dt \tag{5}$$

such that, $$\dot{x}(t) = f(x(t), u(t))$$

$$u_t \geq 0, \quad u_t \geq |\lambda_{m,A}| - \lambda_{sat,A}, \quad u_t \geq |\lambda_{m,B}| - \lambda_{sat,B}$$

where $u=[u_{n,A}, u_t]$ and the term $$\beta u_{n,A}^2$$

was added to the objective function for regularization purposes ($\beta=10^{-7}$). The load transformer's magnetizing flux and $u_{n,A}$ optimal solution to Eq. (5) are shown in FIGS. 11A, 11B, and 12, respectively (labeled: min-max saturation). For this solution, saturation in the load transformers were treated with equal concern: $\lambda_{sat,A}=\lambda_{sat,B}=1.2$ per unit. The primary difference between this solution and the other mitigation solutions (blocking capacitor, LQR, $\lambda_m$ limit) is that the GIC shifting phenomenon is no longer present.

Instead, for the first part of the interval, the min-max solution generally follows the same trajectory as the no mitigation study. However, a small control is being applied during this time (t<3) which reduces the peak magnetizing flux in Transformer A compared to the no mitigation case. At t=3 seconds, the transformer control signal jumps to a large positive value which quickly reduces the magnetizing flux in Transformer A until it reaches −1.2 per unit. Immediately after, the sign of the control signal is reversed and a −1.2 per flux in Transformer A is maintained. Because the flux in Transformer A was driven quickly to −$\lambda_{sat,A}$ (faster than the natural response to the E3a impulse), the flux in Transformer B is allowed to more gradually decrease. Ultimately, this leads Transformer A and Transformer B spending less time above the selected flux threshold than the no mitigation base case study. A comparison of the saturation area calculated via Eq. (4) for the various controllers is shown in Table III.

TABLE III

| 3-Bus Transformer Saturation Area | |
| --- | --- |
| Study | Max. Saturation Area (per unit) |
| no mitigation | 2.134 |
| 1 blocking capacitor | 3.994 (+55.6%) |
| LQR | 3.048 (+42.8%) |
| $\lambda_m$ limit (Txfrm A) | 2.588 (+21.3%) |
| Min-max saturation | 1.719 (−19.5%) |

The EMP mitigation studies for the 3-bus power system demonstrate two important findings: (1) it is possible to limit saturation in both load transformers if they each incorporate some form of protection (blocking capacitor or optimal controller), and (2) if only one transformer is protected a tradeoff must be made between protecting only the local transformer and attempting to protect both transformers.

From a practical perspective, it is clear from FIGS. 9A, 9B, 11A, and 11B that if one is going to add EMP mitigation to the 3-bus system, there is a clear advantage to adding protection to both load transformers instead of only one. This conclusion is enabled by the top-down approach, which shows that even with an optimal controller that was purposefully designed to minimize saturation in both transformers, it is only able to achieve moderately less saturation than when no protection was applied at all. More broadly, however, the top-down approach enables a unified way to understand the tradeoffs when investigating various EMP protection solutions. It is possible that for larger and/or different power system topologies, an acceptable compromise between the number of transformers protected and that saturation that each transformer experiences can be obtained.

Example: Large Power Systems

Figure 13A:
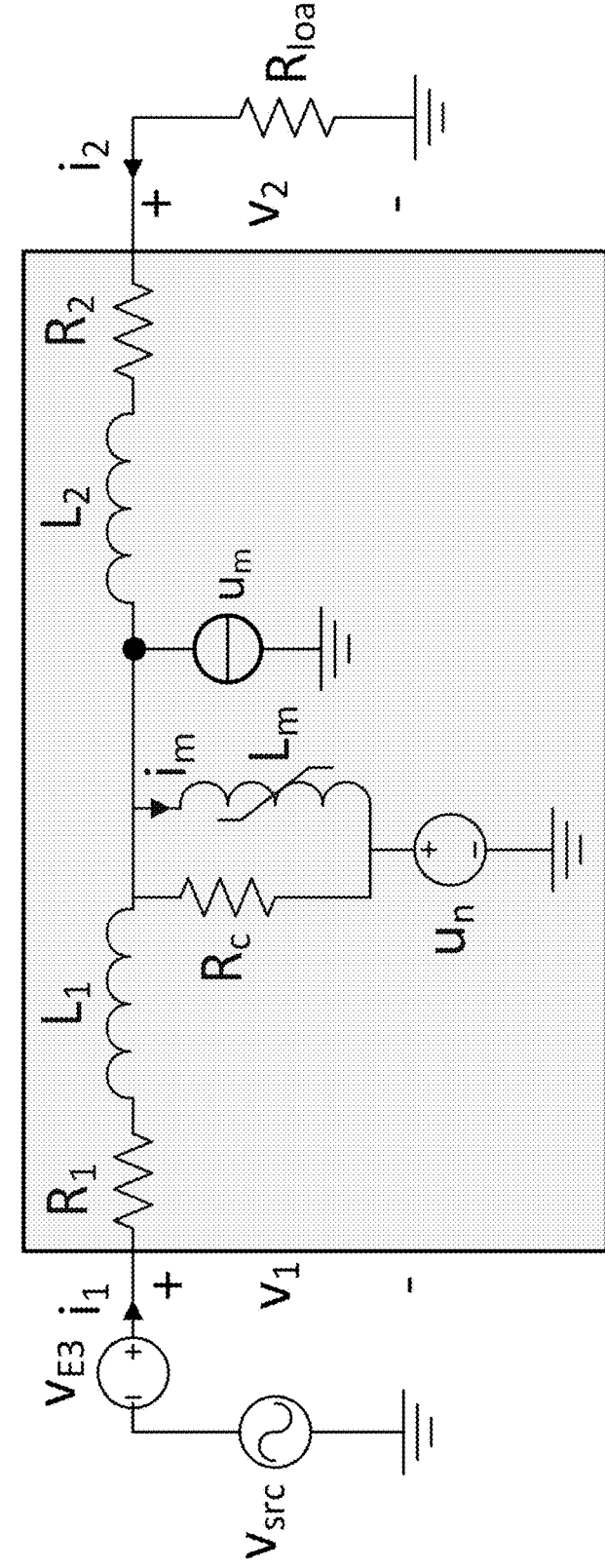
FIG. 13A shows a per-phase saturating transformer model with neutral-path ($u_n$) and magnetizing path ($u_m$) control inputs for HEMP/GMD mitigation.
Figure 13B:
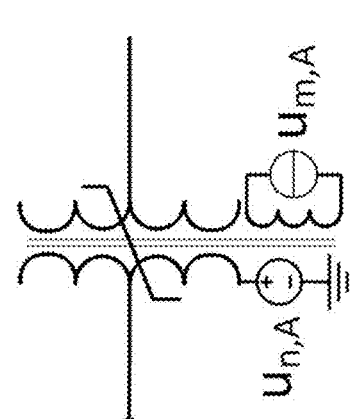
FIG. 13B shows a current source located on a tertiary winding to the transformer core.

The transformer model considered for this example is highlighted in FIG. 13A and is similar to that shown in FIG. 1, but includes the additional current source control input $u_m$ that provides a magnetizing-path control signal to the transformer core. In general, the current source can be located on the primary-side, secondary-side (as shown in FIG. 13A), or even through a tertiary winding if it shares the same core (as shown in FIG. 13B). The components $R_1$, $R_2$, $L_1$, and $L_2$ correspond to the primary- and secondary-side winding resistances and leakage inductances, respectively. The core of the device is modeled by a nonlinear magnetizing inductance $L_m$ and core losses are accounted for by the resistor $R_c$. The voltage source $u_n$ and current source $u_m$ represent the neutral-path BD and magnetizing-path FBD protection devices, respectively. Overall, the transformer equations are given in Eq. (6).

$$L_1 \dot{i}_1 = -(R_1 + R_c)i_1 - R_c(i_2 - i_m + u_m) + v_1 - u_n \tag{6}$$

$$L_2 \dot{i}_2 = -(R_2 + R_c)i_2 - R_c(i_1 - i_m + u_m) + v_2 - u_n$$

$$\dot{\lambda}_m = R_c(i_1 + i_2 - i_m + u_m)$$

The saturating inductor is approximated by an anhysteretic BH curve using the tangent function:

$$i_m = k_1 \tan(k_2 \lambda_m) \tag{7}$$

where $k_1$ and $k_2$ are user selected constants. A plot of Eq. (7) is shown in FIG. 2. Transformer parameters are listed in Table IV and are similar to those shown in Table I.

The impact of a HEMP/GMD event on a power system is typically modeled using ideal voltage sources to represent the geomagnetically induced fields. See R. Horton et al., *IEEE Trans. Power Deliv.* 27(4), 2368 (2012). This example focuses on the effect of a simulated HEMP event, and specifically the E3 or late time component which is the most impactful in terms of generating GICs. A plot of the E3a waveform is shown in FIG. 3, and it is included for illustration purposes on the primary-side input in FIG. 13A. See Department of Energy (DOE), "Physical Characteristics of HEMP Waveform Benchmarks for Use in Assessing Susceptibilities of the Power Grid, Electrical Infrastructures, and Other Critical Infrastructure to HEMP Insults," Jan. 21, 2021.

TABLE IV

| Transformer Parameters | |
| --- | --- |
| Parameter | Value (per unit) |
| $R_1$, $R_2$ | 0.002 |
| $L_1$, $L_2$ | 0.08 |

13

TABLE IV-continued

Transformer Parameters

| Parameter | Value (per unit) |
|---|---|
| $R_c$, $R_{load}$ | 500, 1 |
| $k_1$, $k_2$ | 0.0016, 1.2879 |

Controllability

In the study of dynamical systems, a system is defined to be controllable if the external inputs can drive the internal system state from any initial state to any final state in a finite time. See K. Ogata, *Modern Control Engineering* (3rd Ed.), USA: Prentice-Hall, Inc. (1996). For a linear time-invariant system:

$$\dot{x} = Ax + Bu \tag{8}$$

controllability can be assured if the controllability matrix $$C = [B \quad AB \quad A^2B \quad \cdots \quad A^{n-1}B] \tag{9}$$

has full row rank, where n is the number of states.

Single Transformer. For the transformer model in Eq. (6), a linearized state-space model is given by:

$$\dot{x} = \overbrace{\begin{bmatrix} \dfrac{-(R_1 - R_c)}{L_1} & \dfrac{-R_c}{L_1} & \dfrac{R_c}{L_mL_1} \\ \dfrac{-R_c}{L_2} & \dfrac{-(R_2 + R_c)}{L_2} & \dfrac{R_c}{L_mL_2} \\ R_c & R_c & \dfrac{-R_c}{L_m} \end{bmatrix}}^{A} x + \overbrace{\begin{bmatrix} \dfrac{-1}{L_1} & \dfrac{-R_c}{L_1} \\ \dfrac{-1}{L_2} & \dfrac{-R_c}{L_1} \\ 0 & R_c \end{bmatrix}}^{B} \begin{bmatrix} u_n \\ u_m \end{bmatrix} \tag{10}$$

where $x=[i_1 \ i_2 \ \lambda_m]^T$ and the nonlinear magnetizing inductance Eq. (7) was linearized with $i_m = \lambda_m/L_m$. The controllability matrix can thus be calculated as:

$$C = [B \quad AB \quad A^2B] \tag{11}$$

In practice, the neutral-blocking approach and magnetizing current compensation approach would likely not be implemented on the same transformer. Thus, the controllability for each control input is considered separately. Evaluating Eq. (11) for both the neutral-blocking approach (with $u_m=0$) and the flux-blocking approach (with $u_n=0$) and reducing to row-echelon form, the controllability matrix yields:

$$C \overset{rref}{\to} \begin{bmatrix} 1 & 0 & 0 \\ 0 & 1 & 0 \\ 0 & 0 & 1 \end{bmatrix} \tag{12}$$

which is the identity matrix and has full rank. This implies that the transformer is controllable with both HEMP/GMD mitigation approaches.

A schematic of an exemplary three-bus power system with 14 states is shown in FIG. 8. Transmission parameters

Figure 14:
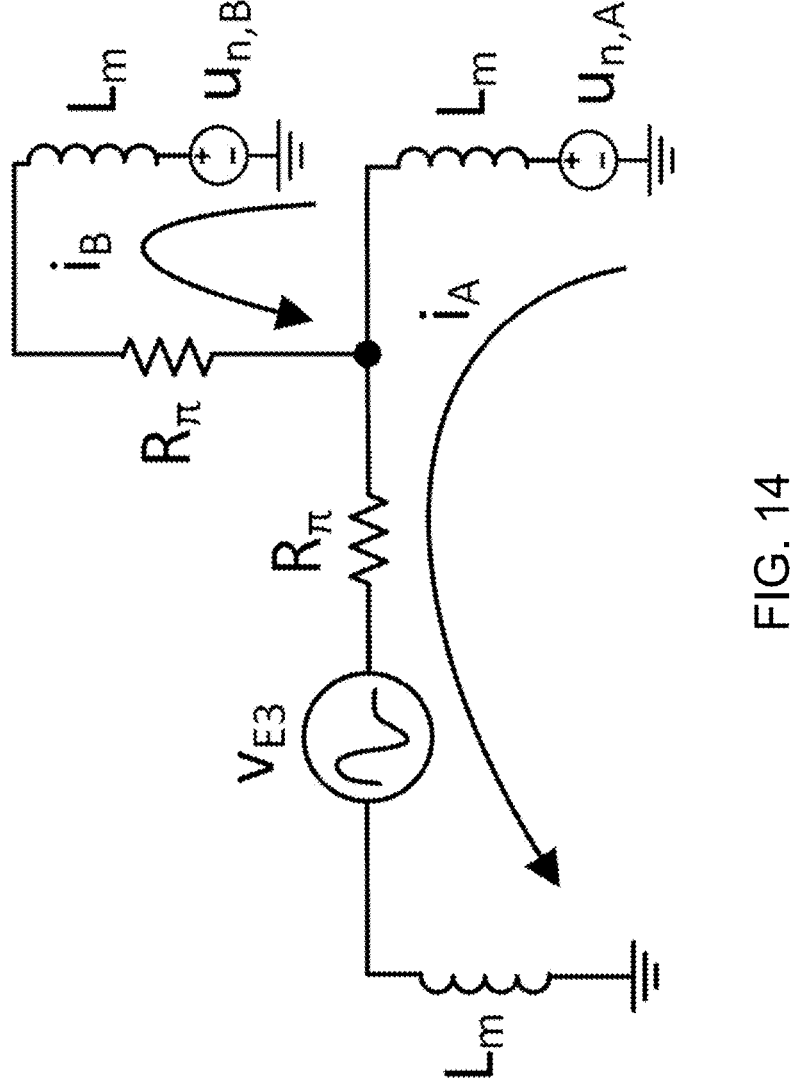
FIG. 14 shows a reduced system with two states for controllability analysis of the three-bus power system shown in FIG. 8.

14 are listed in Table V and are similar to those shown in Table II. Since a practical power system will consist of many interconnected transformers, it is insightful to evaluate the controllability of such a system when fewer than all of the transformers have HEMP/GMD protection installed. To simplify the analysis, a reduced system of the same circuit is shown in FIG. 14 which neglects the states associated with the transmission lines and the transformer leakage inductances. As before, the controllability of the reduced system can be determined by analyzing the rank of the controllability matrix C. Two cases are considered: first, when both transformers labeled A and B have a control input ($u_{n,A}$ and $u_{n,B}$, respectively), and second, when only transformer A has control input. For the first case, a state-space equation for the system is $$\dot{x} = \overbrace{\begin{bmatrix} \dfrac{-2R_\pi}{3L_m} & \dfrac{-R_\pi}{3L_m} \\ \dfrac{-R_\pi}{3L_m} & \dfrac{-2R_\pi}{3L_m} \end{bmatrix}}^{A} x + \overbrace{\begin{bmatrix} \dfrac{1}{3L_m} & \dfrac{1}{3L_m} \\ \dfrac{-1}{3L_m} & \dfrac{2}{3L_m} \end{bmatrix}}^{B} u \tag{13}$$

where $x=[i_A \ i_B]$ and $u=[u_{n,A} \ u_{n,B}]$. Computing the controllability matrix and reducing to row-echelon form yields:

$$C = [B \quad AB] \overset{rref}{\to} \begin{bmatrix} 1 & 0 & \dfrac{-R_\pi}{3L_m} & \dfrac{-R_\pi}{3L_m} \\ 0 & 1 & 0 & \dfrac{-R_\pi}{3L_m} \end{bmatrix} u \tag{14}$$

which has full row-rank—thus the system is controllable.

In contrast, when only transformer A is used for control ($u_{n,B}=0$), the state-space equation can be written as:

$$\dot{x} = \overbrace{\begin{bmatrix} \dfrac{-2R_\pi}{3L_m} & \dfrac{-R_\pi}{3L_m} \\ \dfrac{-R_\pi}{3L_m} & \dfrac{-2R_\pi}{3L_m} \end{bmatrix}}^{A} x + \overbrace{\begin{bmatrix} \dfrac{1}{3L_m} \\ \dfrac{-1}{3L_m} \end{bmatrix}}^{B} u \tag{15}$$

where $u=u_{n,A}$. The controllability matrix reduced to row-echelon form is given by $$C = [B \quad AB] \overset{rref}{\to} \begin{bmatrix} 1 & \dfrac{-R_\pi}{3L_m} \\ 0 & 0 \end{bmatrix} u \tag{16}$$

which is rank deficient and thus the system is not controllable. Similar analysis for the flux-blocking approach reveals the three-bus system is controllable when both load transformers have mitigation, but the system in not controllable when only one of the two load transformers has a FBD installed.

TABLE V

Transmission Line Parameters

| Parameter | Value |
|---|---|
| $R_\pi$ | 12.7 (mΩ/mile) |
| $L_\pi$ | 0.9337 mH/mile |

TABLE V-continued

| Transmission Line Parameters | |
| --- | --- |
| Parameter | Value |
| $C_\pi$ | 12.5 nF/mile |
| $V_{E3}$ | See FIG. 3 |

Transfer Function Analysis and GIC Shifting

Figure 15:
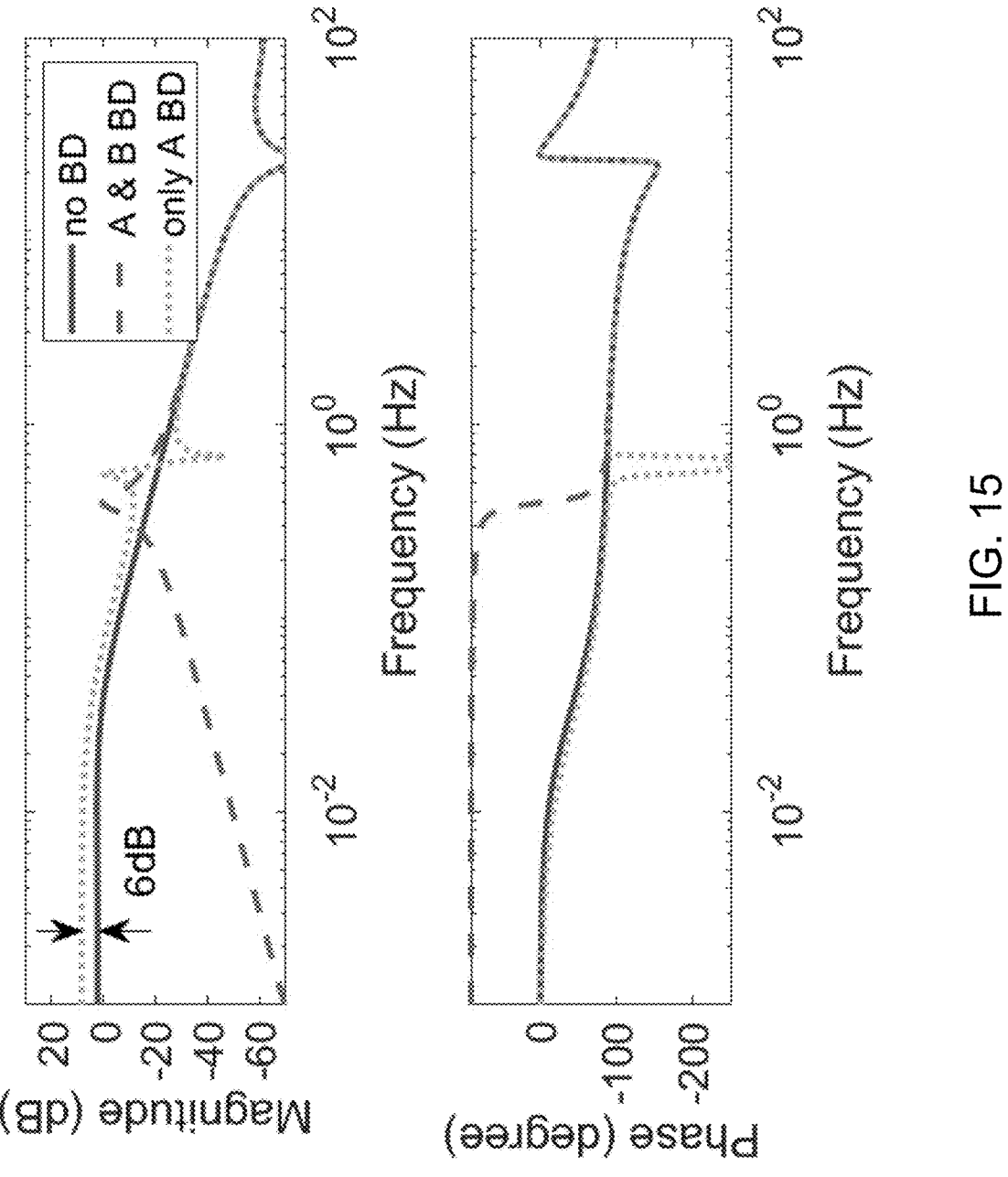
FIG. 15 is a Bode plot of the transfer function from $V_{E3}$ to $\lambda_{m,B}$ for the three-bus system.

Neutral Blocking: For the neutral-path BD, a Bode plot of the transfer function from $V_{E3}$ to the magnetizing flux of transformer B ($\lambda_{m,B}$) in the three-bus system is shown in FIG. 15. For this transfer function, three different cases are considered: no blocking device (BD) at either transformers A or B, the case when both transformers utilize a BD, and finally, the case when only transformer A uses a BD. For each case with a BD, a capacitor (C=2.7 mF) was inserted in the neutral-path by enforcing:

$$u_n = \frac{1}{c} \int (i_1 + i_2)dt \approx \frac{1}{c} \int i_m dt \qquad (17)$$

As can be seen for the no BD case, the transfer function from $V_{E3}$ to $\lambda_{m,B}$ is predominately a first order response corresponding to the RL circuit formed by the transmission line resistance and the transformer inductance. When BDs are present on both transformers, the response from $V_{E3}$ to transformer B flux is reduced significantly in the low frequency range (<1 Hz), as expected for a capacitive BD. Finally, for the case when only transformer A uses a BD, it is observed that the resulting gain from $V_{E3}$ to $\lambda_{m,B}$ is increased by approximately 6 dB. This implies that the insertion of a blocking device at one transformer can exacerbate the impact of the HEMP/GMD insult at a neighboring transformer, a phenomenon which has been termed GIC shifting. See M. Lu et al., *IEEE Trans. Power Syst.* 33(3), 2539 (2018).

Flux Blocking: The flux-blocking device works by injecting a compensating current control signal in parallel to the transformer magnetizing inductance. For example, this can be accomplished through a tertiary winding. See A. H. Naghshbandy et al., "Blocking dc flux due to geomagnetically induced currents in the power network transformers," in 34*th International Power System Conference (PSC*2019), 9-11 Dec. 2019. Unlike the neutral BD, the FBD does not interrupt the flow of GICs through a transformer, and hence is not expected to cause GIC shifting. The control scheme used for the FBD considered in this section drives the control input $u_m$ with an integrator feedback based on the transformer magnetizing current to maintain an analogy with the capacitor BD in Eq. (17).

Figure 16:
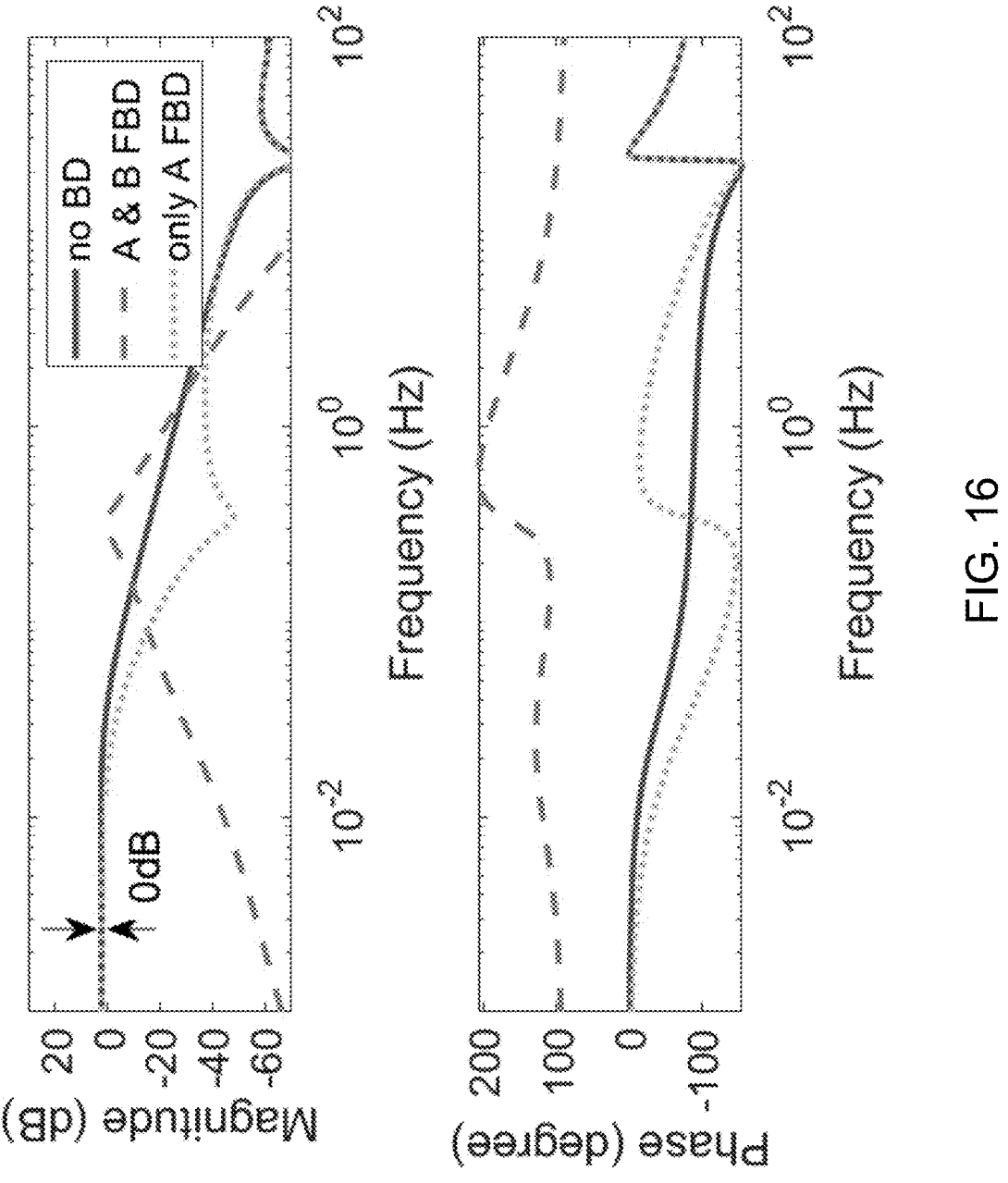
FIG. 16 is a Bode plot of the transfer function from $V_{E3}$ to $\lambda_{m,B}$ for the three-bus system with blocking devices.

A Bode plot of the transfer function from $V_{E3}$ to $\lambda_{m,B}$ is shown in FIG. 16. Again, three cases are considered: no mitigation case, a case where transformer A and B are both configured with a FBD, and finally a case in which only transformer A has a FBD. Like in FIG. 15, when mitigation is used on both transformers the gain from $V_{E3}$ to $\lambda_{m,B}$ is small, particularly in the low frequency region where HEMP/E3 and GMD has the most impact. Unlike in FIG. 15, it is clear from FIG. 16 that when transformer A alone is protected, this does not increase the impact of the E3 insult at transformer B.

Figure 17A:
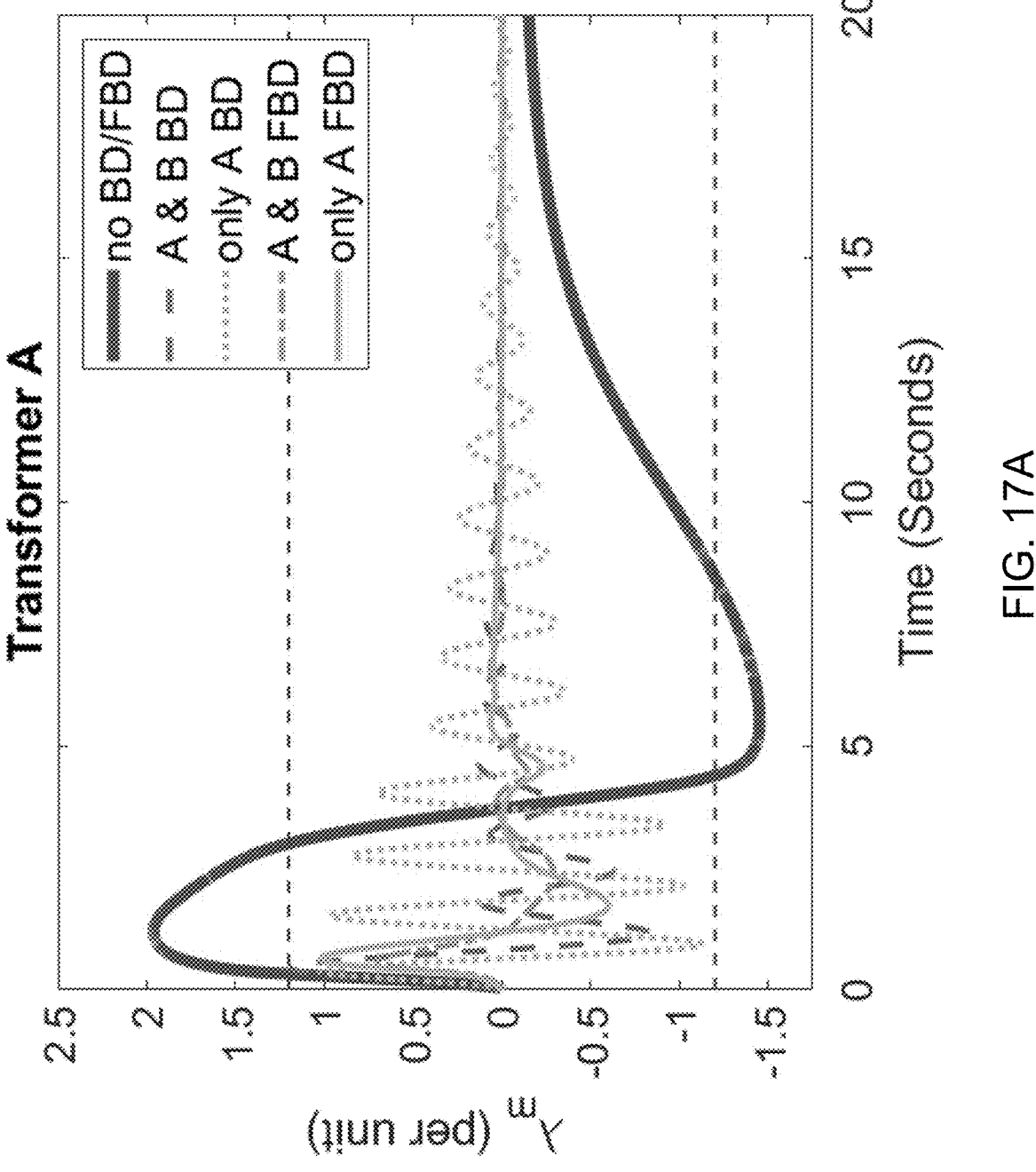
FIGS. 17A and 17B show simulation results for neutral BD and FBD mitigation for Transformer A and Transformer B, respectively, on a three-bus power system.
Figure 17B:
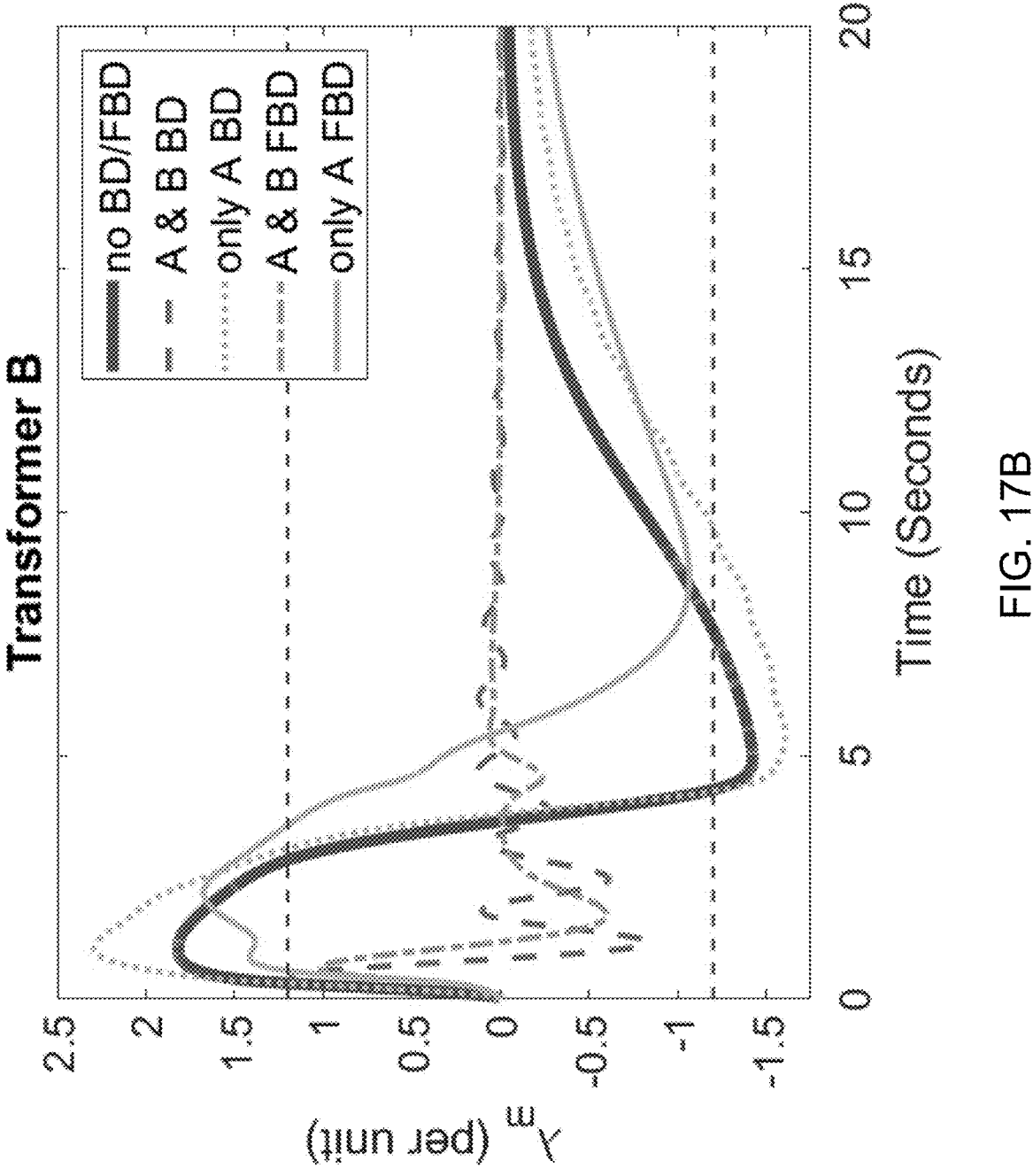

The analysis associated with the transfer functions shown in FIGS. 15 and 16 can also be verified through time domain simulation. In the simulation, the three-bus system is subjected to a simulated HEMP event by incorporating the E3a waveform shown in FIG. 3 into the system transmission line models. The resulting magnetizing flux for transformers A and B are shown in FIGS. 17A and 17B, respectively.

For transformer A, the magnetizing flux is kept below the knee of the BH-curve (1.2 per unit) for all cases when a BD or FBD was present. In contrast, for studies where transformer A has HEMP/GMD protection but transformer B does not, the flux in transformer B is pushed into the saturated regime and exceeds the 1.2 per unit threshold indicated. However, it is noted that compared to the case when a neutral BD is installed at transformer A alone, a FBD at A alone does not exacerbate the effect of the insult at B. This is consistent with the increased gain seen in FIG. 15 and not present in FIG. 16.

Example: Four-Bus Power System

Figure 18:
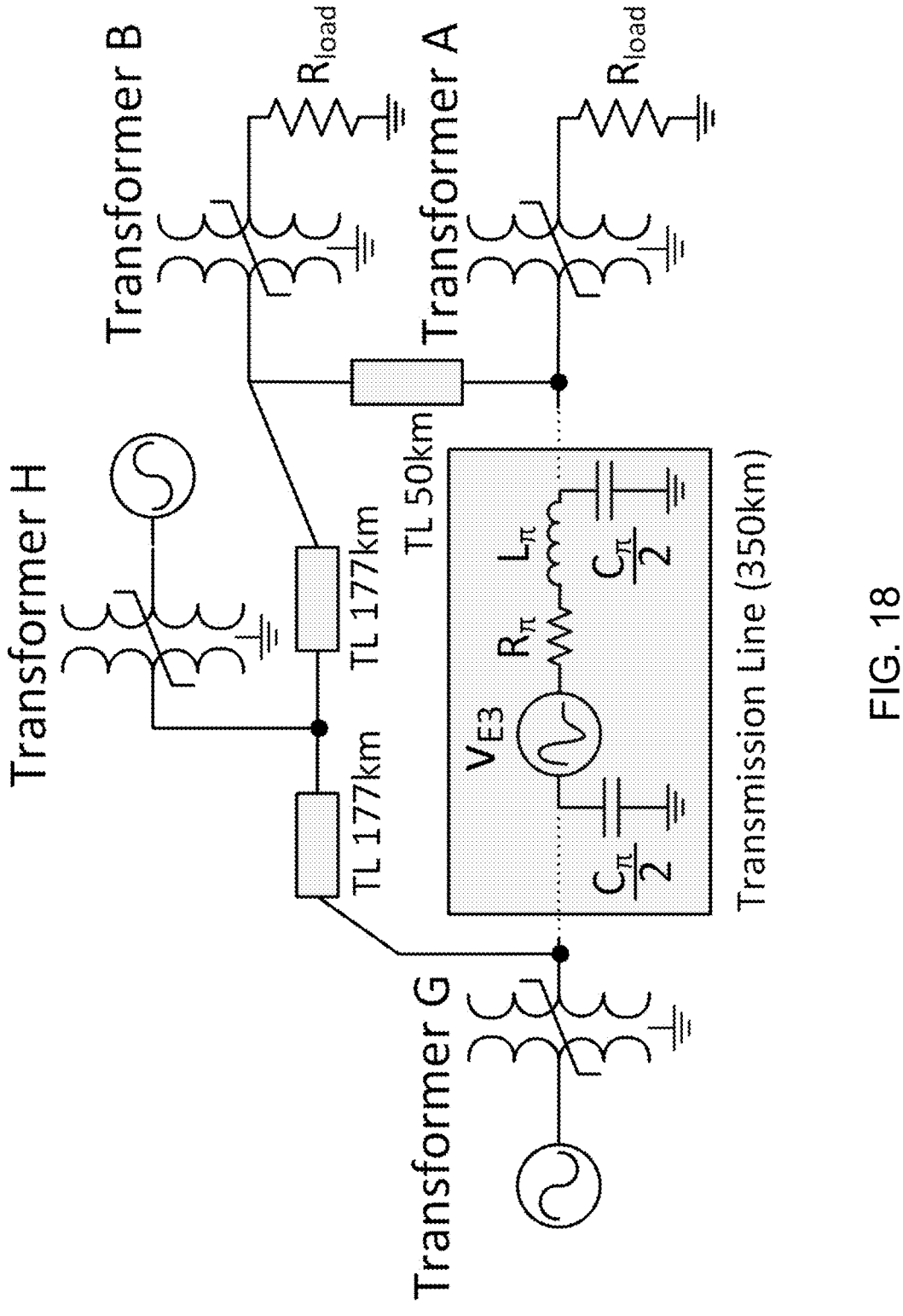
FIG. 18 shows a circuit diagram for a four-transformer power system.
Figure 19A:
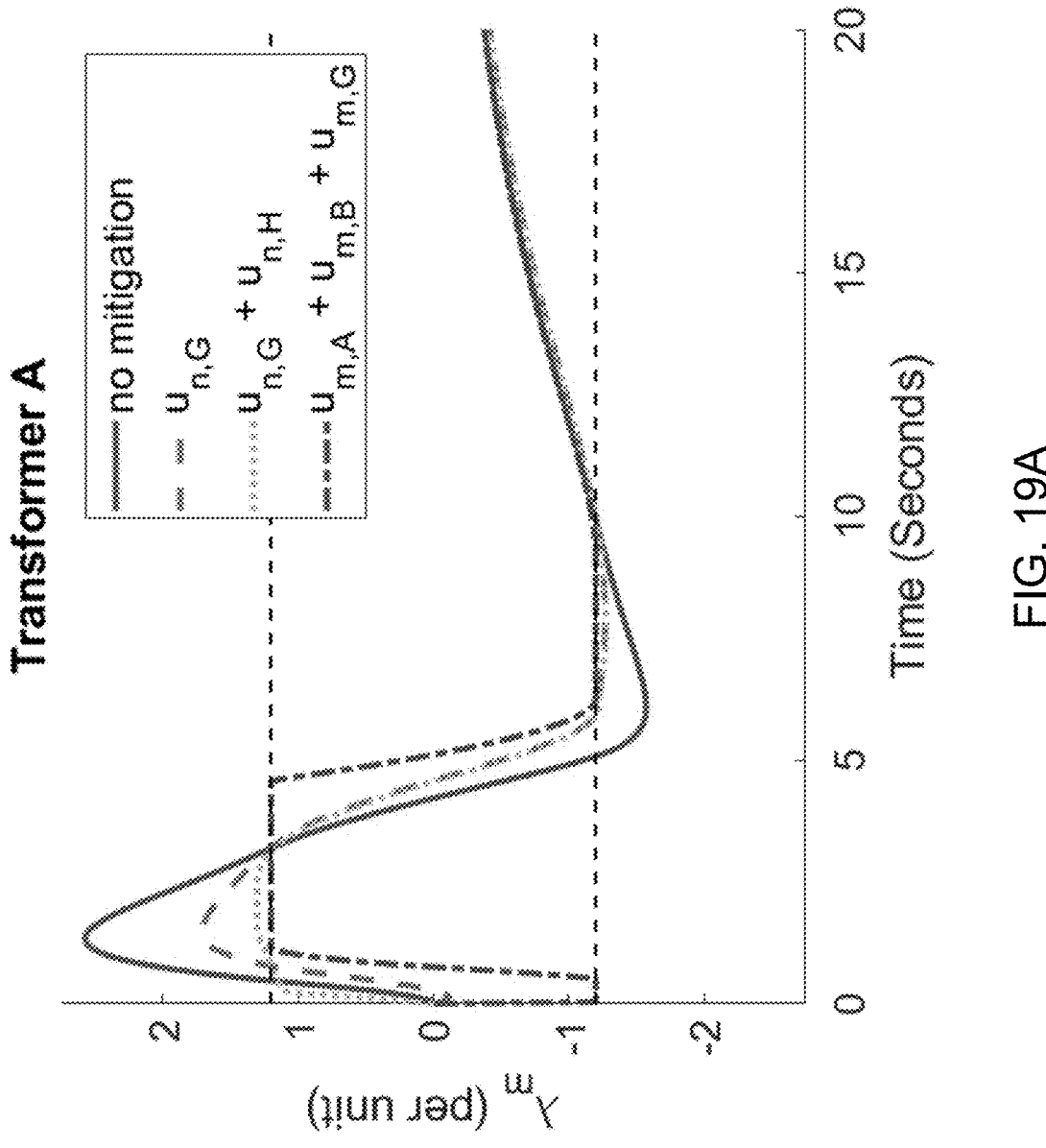
FIGS. 19A, 19B, 19C, and 19D show the impact of HEMP/GMD mitigation device type and placement for Transformer A, Transformer B, Transformer G, and Transformer H, respectively, for a four-transformer power system.
Figure 19B:
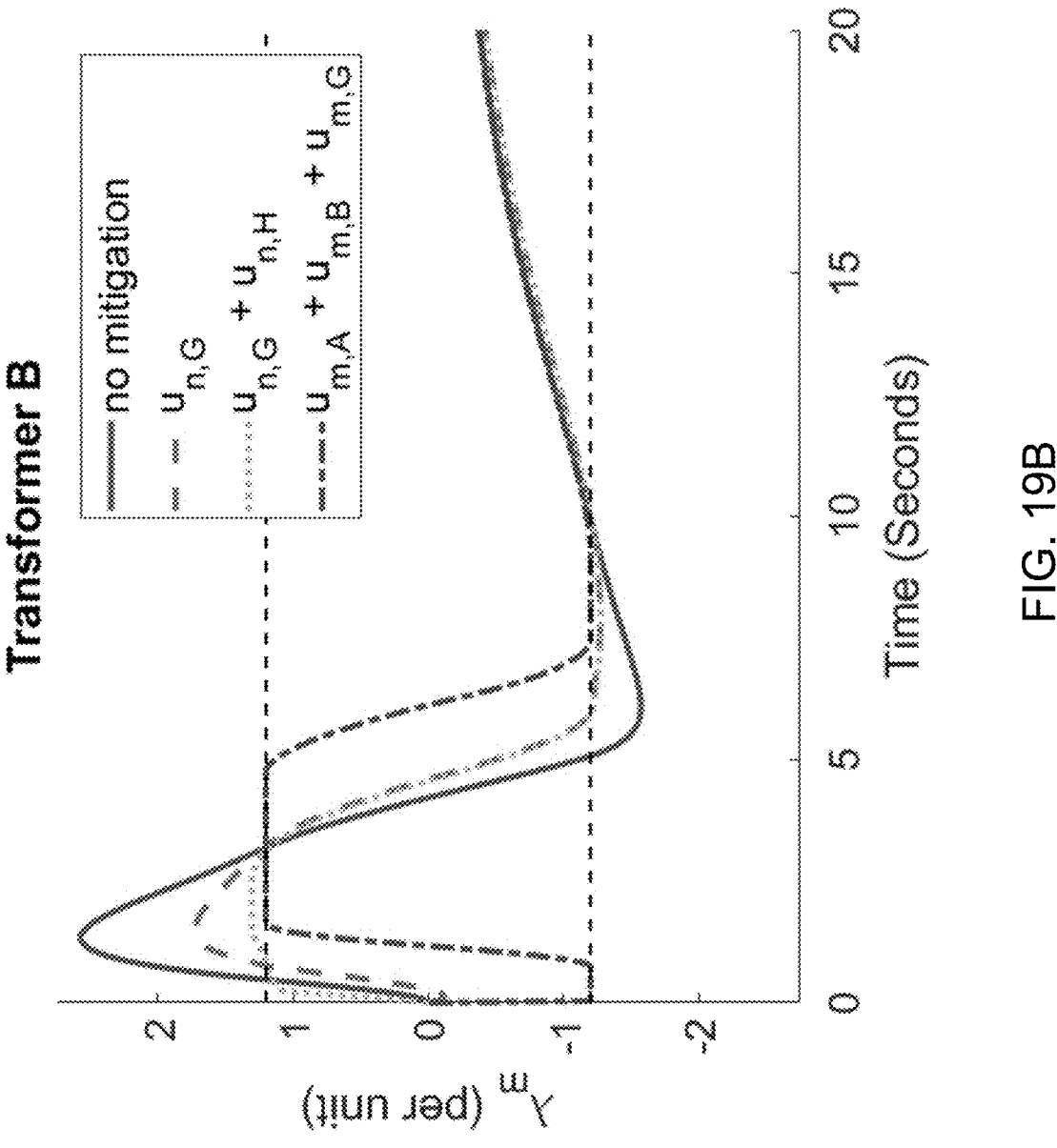
Figure 19C:
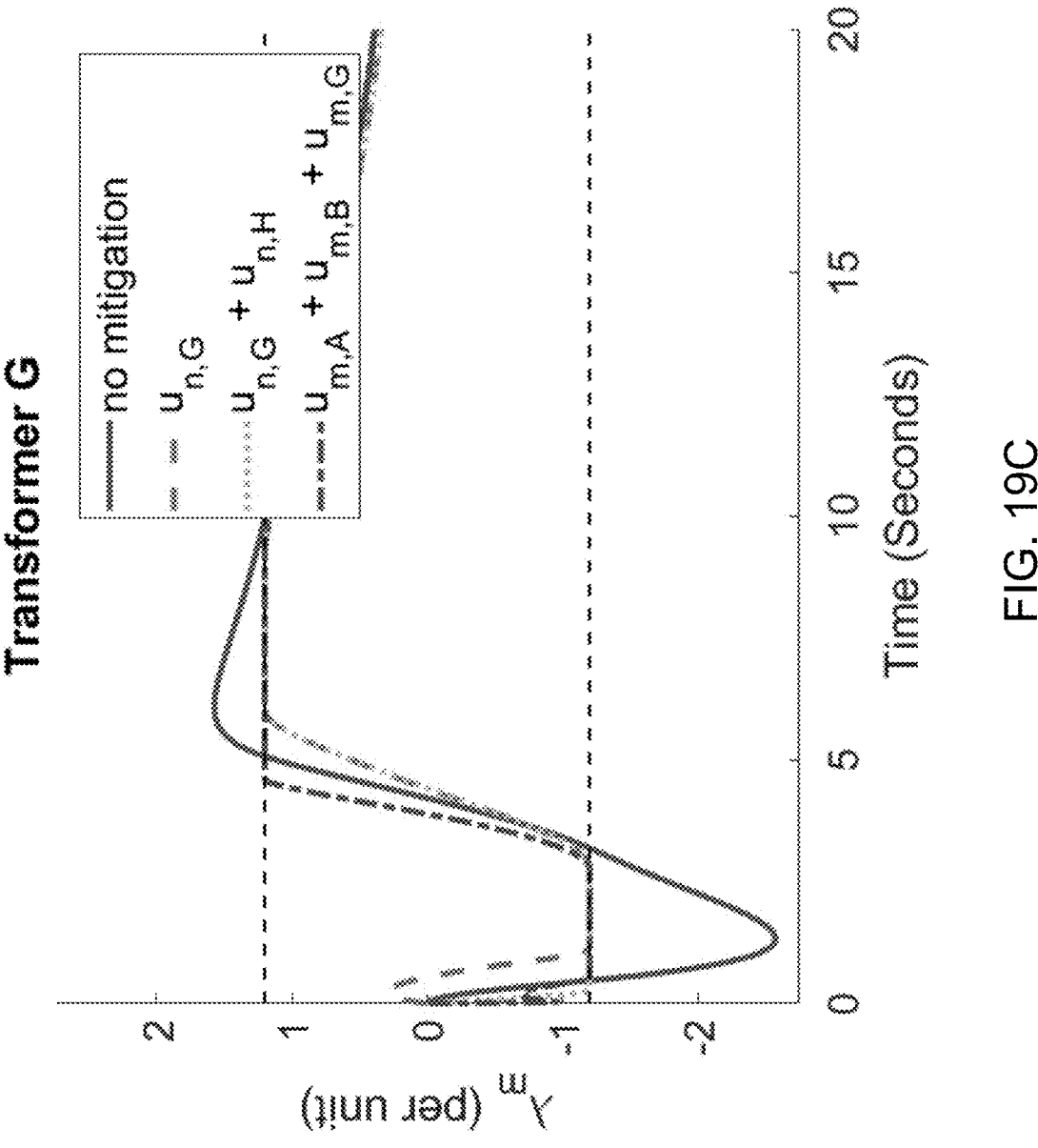
Figure 19D:
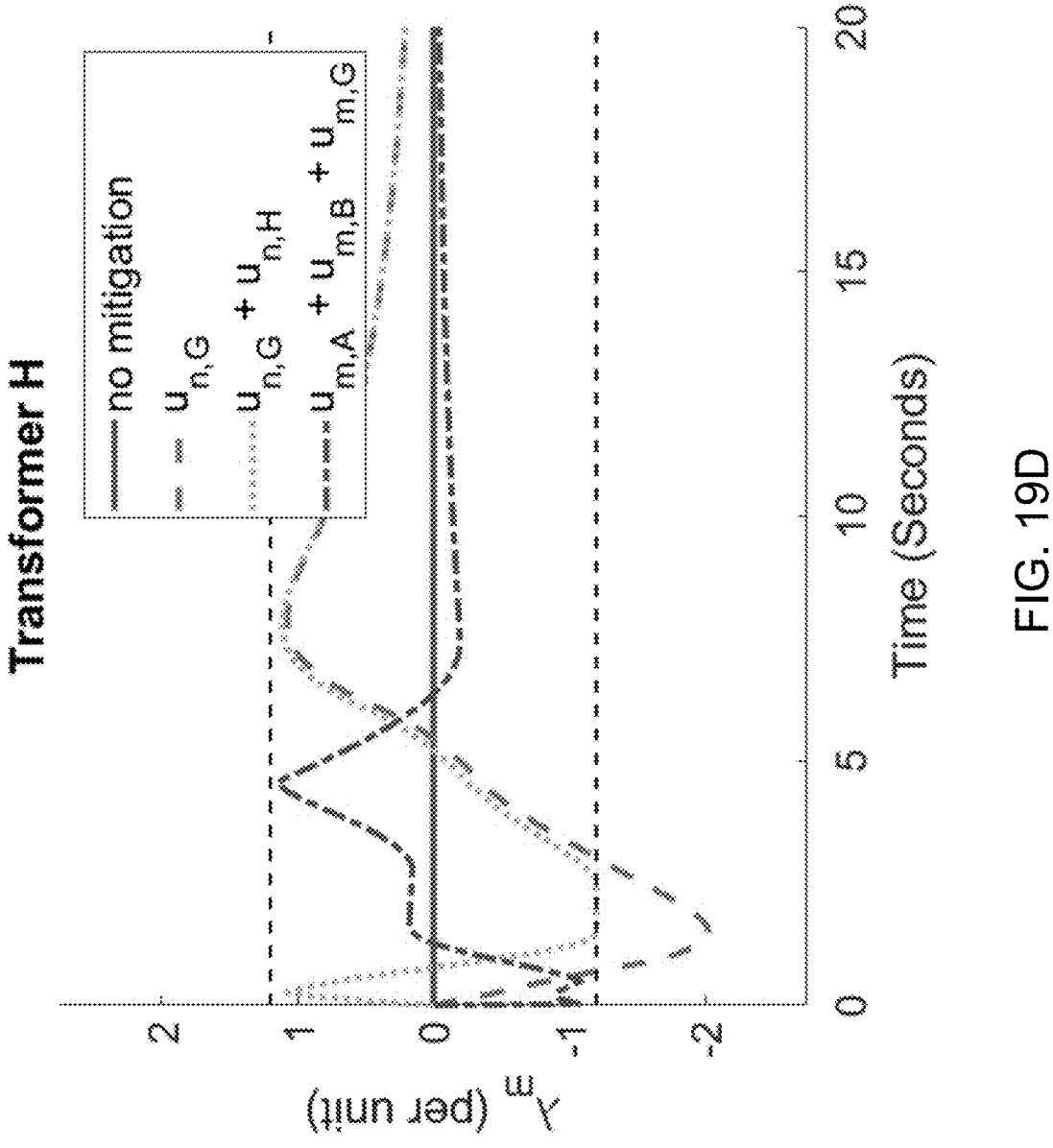

To compare with the three-bus power system described above, and to illustrate how both neutral blocking and flux blocking mitigation approaches can serve distinct roles, the four-bus power system shown in FIG. 18 is considered.

To determine the control signals that are required to best protect a transformer from an HEMP/GMD insult, the top-down control mitigation scheme described above is employed. The top-down approach uses an optimal control formulation for dynamical systems, as shown in Eq. (3). Therein, an optimization problem is solved with an objective function J, subject to the condition that the system dynamics $\dot{x}(t)=f$ and certain path constraints, g, are satisfied.

For this four transformer system study, all possible combinations of neutral-BD and flux-BD placement were considered. The optimal control problem shown in Eq. (3) was solved using optim Traj in MATLAB. See M. Kelly, *SIAM Review* 59(4), 701 (2017). For each study, the optimal control problem was configured to minimize the control input while ensuring if a transformer had HEMP/GMD protection installed, its magnetizing flux was kept below the BH-curve saturation limit. That is, the objective function $F=u^2$ and constraint function $-\lambda_{m,sat} < \lambda_{m,x} < \lambda_{m,sat}$ for all $x \in$ A, B, G, H was considered, where $\lambda_{m,sat}=1.2$ per unit.

The results for a few select studies are shown in FIGS. 19A-19D. To help understand these results, the total saturation area (s.a.)—which defined as the area under the curve for flux values greater than 1.2 p.u.—is shown in Table VI for these select studies. The s.a. was calculated using:

$$s.a. = \int \sum_x \max(|\lambda_{m,x}| - \lambda_{m,sat}, 0) \qquad (18)$$

for $x \in$ A, B, G, H.

In general, there is a trade-off between the number and type of mitigation that is present in the system, and the corresponding total saturation area. Overall, it is found that the best mitigation performance that can be obtained with one BD was a neutral BD on Transformer G. Similarly, with two BDs, the best placement is neutral BDs on both Transformers G and H. However, if three BDs are available, it was found that the best selection of placement was to use flux-blocking devices on transformers A, B, and G. For this case, the saturation area was found to be effectively zero, which can verified in FIGS. 19A-19D.

TABLE VI

| Saturation area (s.a.) for a few select blocking device type and placement. | | | |
|---|---|---|---|
| Mitigation type | # BD | # FBD | Total # BD | s.a. (p.u.) |
| No mitigation | 0 | 0 | 0 | 9.8318 |
| $U_{n, G}$ | 1 | 0 | 1 | 3.1097 |
| $U_{n, G} \, U_{n, H}$ | 2 | 0 | 2 | 0.78696 |
| $U_{m, A} \, U_{m, B} \, U_{m, G}$ | 0 | 1 | 3 | 1.4471e–09 |

Example: 20-Bus Power System

A dynamic model of a 20-bus power system was developed that focuses on the key physical characteristics of the grid that are most relevant for HEMP/GMD impact studies. This includes a reduced order model of saturating transformers, the coupling of HEMP/GMD electric fields onto transmission lines, and a model of GICs being conducted through the earth via a ground resistance network. The dynamic model is based on a static model described in Horton et al., which has been updated to include dynamic models of power system components. See R. Horton et al., *IEEE Trans. Power Deliv.* 27(4), 2368 (2012). This dynamic model is expected to more accurately portray the behavior of a physical system during a transient event such as a HEMP or GMD. An optimal control formulation is also provided for studying mitigation strategies as applied to a larger and more representative grid scenario with the 20-bus model.

Saturating Transformer

The nonlinear saturating transformer model used for the 20-bus power system study is shown at the per-phase saturating transformer in FIG. 1. The core of the transformer is modeled by a nonlinear magnetizing inductance $L_m$, which is defined by an algebraic relationship between the magnetizing current $i_m$ and the magnetizing flux linkage, $\lambda_m$. The tangent function used for a simple approximation to a BH-curve is shown in FIG. 2. The voltage source $u_n$ represents an added component for HEMP/GMD mitigation that sits between the transformer neutral and ground. For generality, this component is assumed to be an ideal voltage source, however in practice it can represent a grounded neutral ($u_n$=0), a neutral blocking capacitor, or any desired control signal. The equations that define the transformer behavior are shown in Eqs. (1) and (2). The parameters of the model are listed in Table VII.

TABLE VII

| Transformer Parameters | |
|---|---|
| Parameter | Value (per unit) |
| $R_1$, $R_2$ | Listed in Horton et al. |
| $L_1$, $L_2$ | 0.08 |
| $R_c$ | 500 |
| $k_1$, $k_2$ | 0.0016, 1.2879 |
| Rated-power | 300 MW |

Transmission Lines and Substation Grounding

Figure 20:
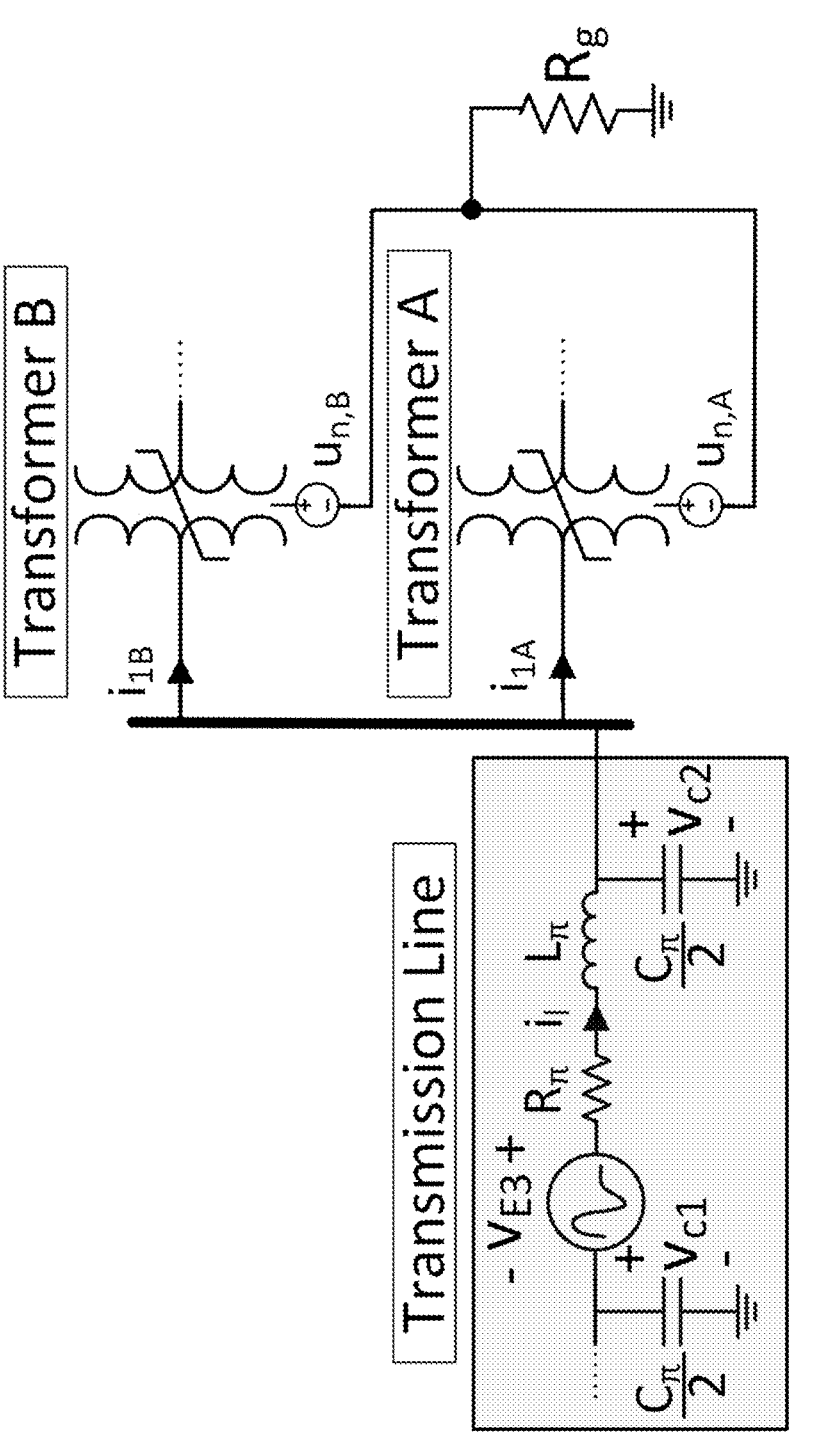
FIG. 20 is a schematic illustration of a transmission line connected to two transformers at a substation with ground resistance $R_g$.

The transmission lines were modeled using a pi-equivalent circuit and the conduction of GICs through earth is modeled at each substation with a resistor $R_g$. An illustration of a transmission line connected to a substation is shown in FIG. 20. The dynamic equation which describes the transmission line series behavior is given by:

$$L_\pi i_l = v_{c1} + V_{E3} - i_l R_\pi - v_{C2} \tag{19}$$

and at the substation bus, the shunt capacitor behavior is governed by:

$$\frac{C_\pi}{2} \dot{v}_{c2} = i_l - i_{1A} - i_{1B} \tag{20}$$

Figure 21:
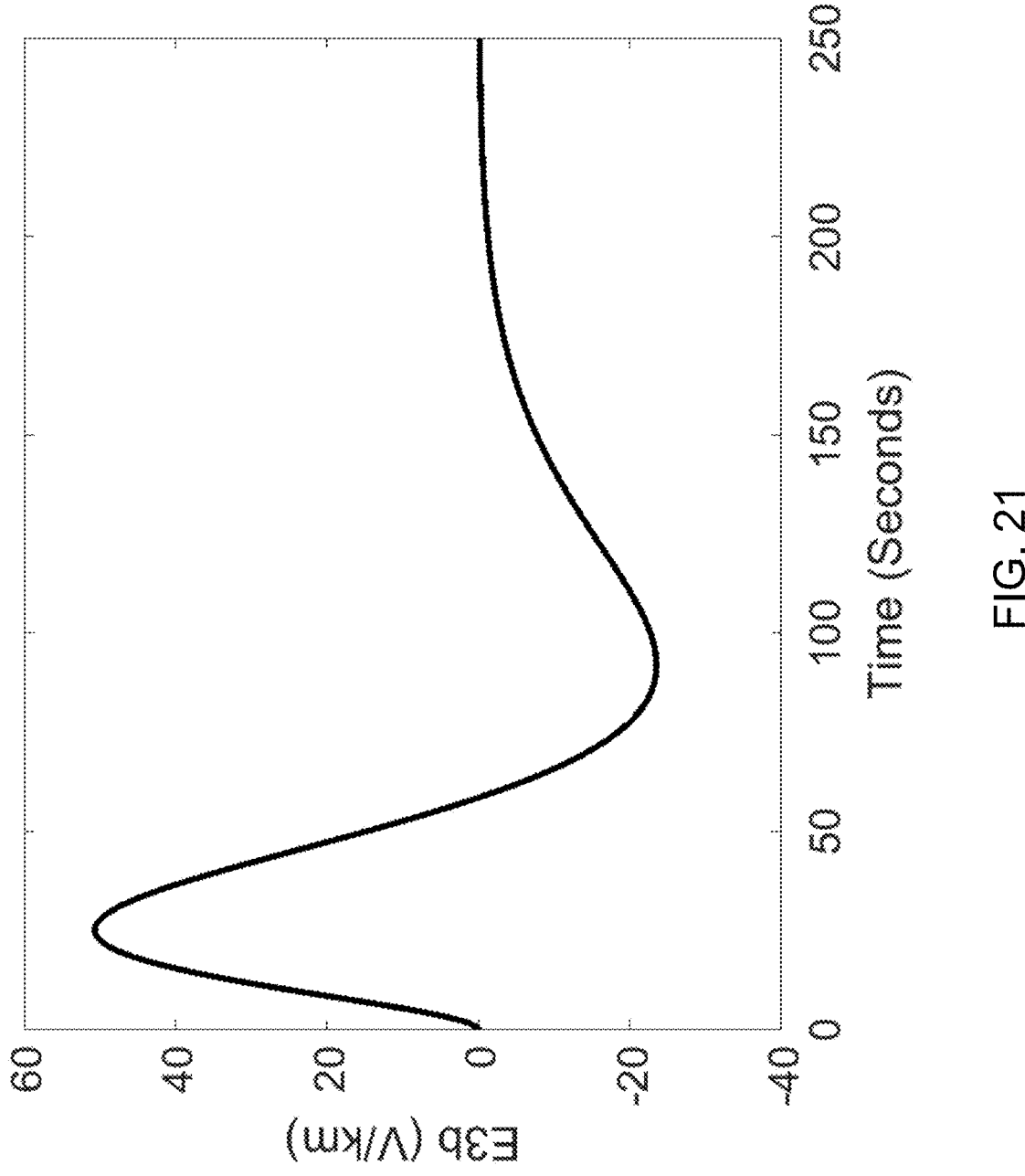
FIG. 21 shows the Dept. of Energy E3b "Heave" waveform. See *Physical Characteristics of HEMP Waveform*, U.S. Department of Energy memo.

The embedded voltage source $V_{E3}$ in FIG. 20 corresponds to a simulated HEMP/E3 insult. An illustration of the E3b waveform is shown in FIG. 21. The parameters of the transmission line are provided in Table VIII.

TABLE VIII

| Transmission Line Parameters | |
|---|---|
| Parameter | Value |
| $R_{\pi, \, 345 \, kV}$ | 9.4 (mΩ/mile) |
| $R_{\pi, \, 500 \, kV}$ | 4.7 (mΩ/mile) |
| $L_\pi$ | 0.93 mH/mile |
| $C_\pi$ | 12.5 nF/mile |
| $R_g$ | Listed in Horton et al. |

Figure 22:
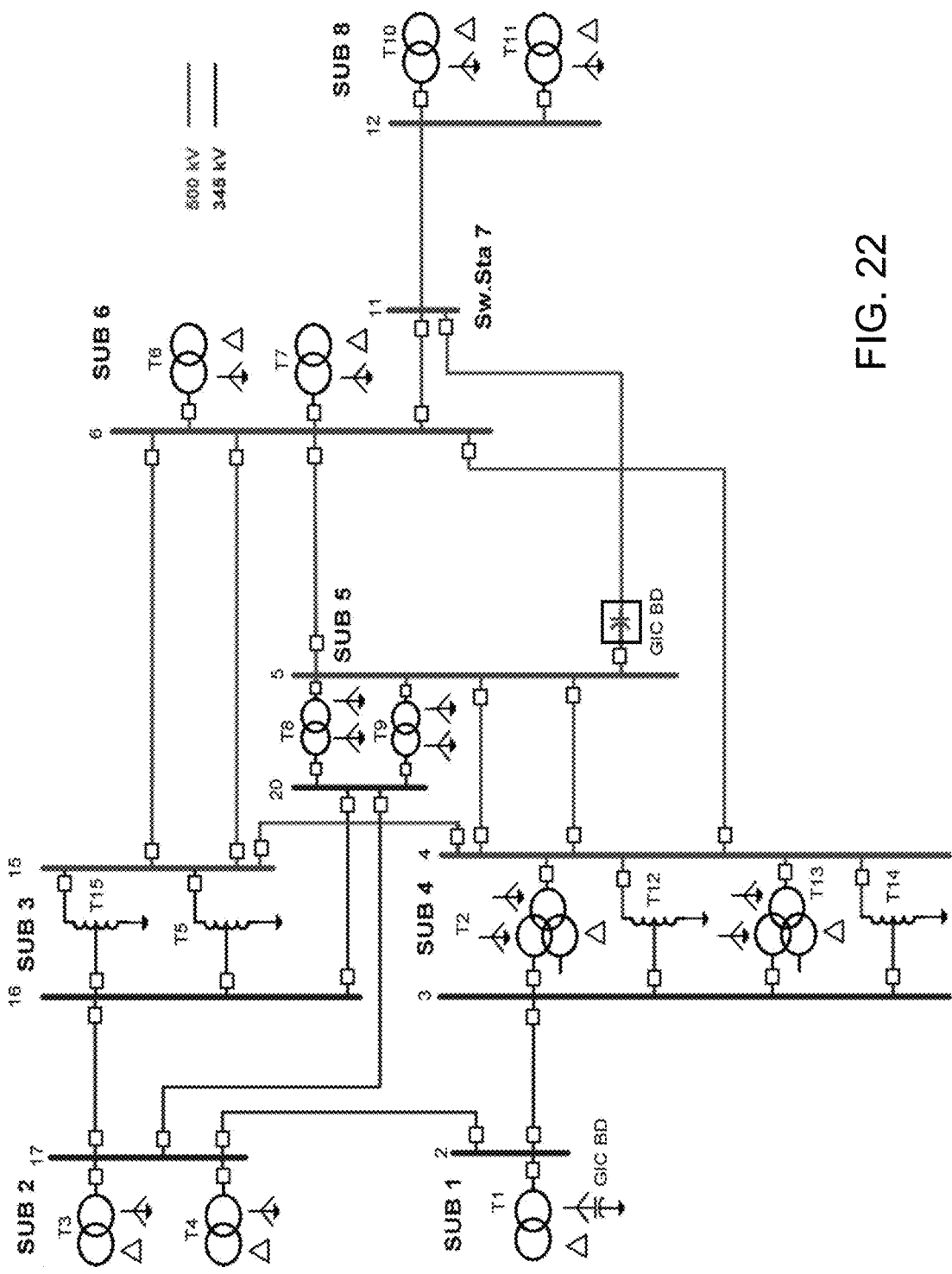
FIG. 22 is a one-line diagram of 20-bus power system, adapted from Horton et al. See R. Horton et al., *IEEE Trans. Power Deliv.* 27 (4), 2368 (2012).

A one-line diagram of the 20-bus power system is shown in FIG. 22. Geographically, the latitude and longitude of each substation are specified in Horton et al., including a map indicating their locations. See R. Horton et al., *IEEE Trans. Power Deliv.* 27(4), 2368 (2012).

DC Solution

To compare the dynamic model of the present invention to the original static model proposed in Horton et al., a dc solution of the dynamic model was found. In particular, given the differential equations for each power system component, and applying appropriate KVL/KCL Kirchoff's Law relations for each substation connection, the dynamic model can be written as:

$$\dot{x} = f(x, u) \tag{21}$$

where x corresponds to the states of the system (transformer currents/fluxes, transmission line currents/voltages), u corresponds to the control inputs, which is a vector of neutral injection voltages ($u = [u_{n,T1}, \, u_{n,T2} \, . \, . \, . \,]$), and f is the nonlinear function relating state variables to their time-derivatives.

The dc solution of the dynamic model can then be determined by solving:

$$\dot{x} = f(x, u) = 0 \tag{22}$$

Figure 23A:
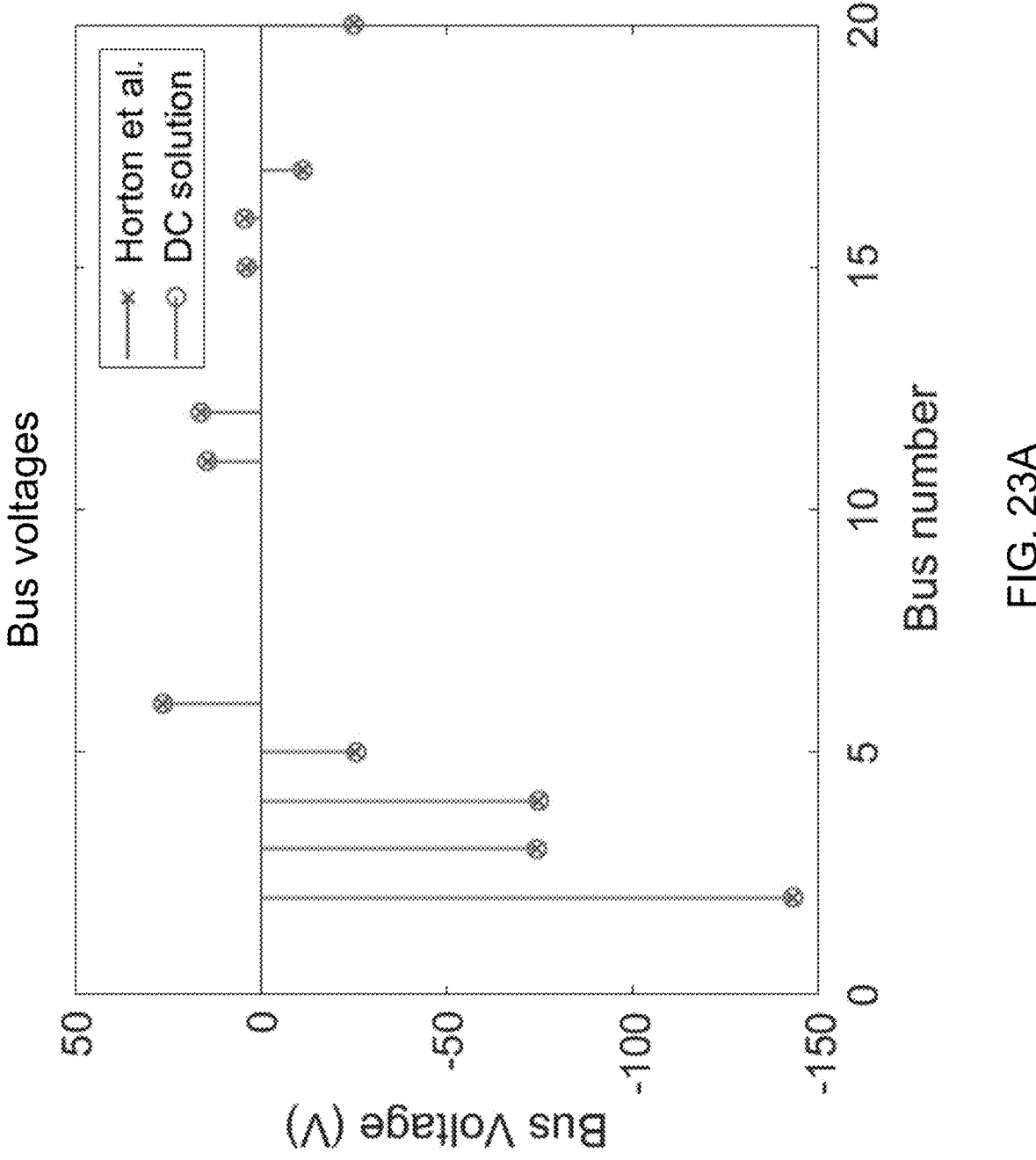
FIGS. 23A and 23B show a DC solution of dynamic model compared to published values.
Figure 23B:
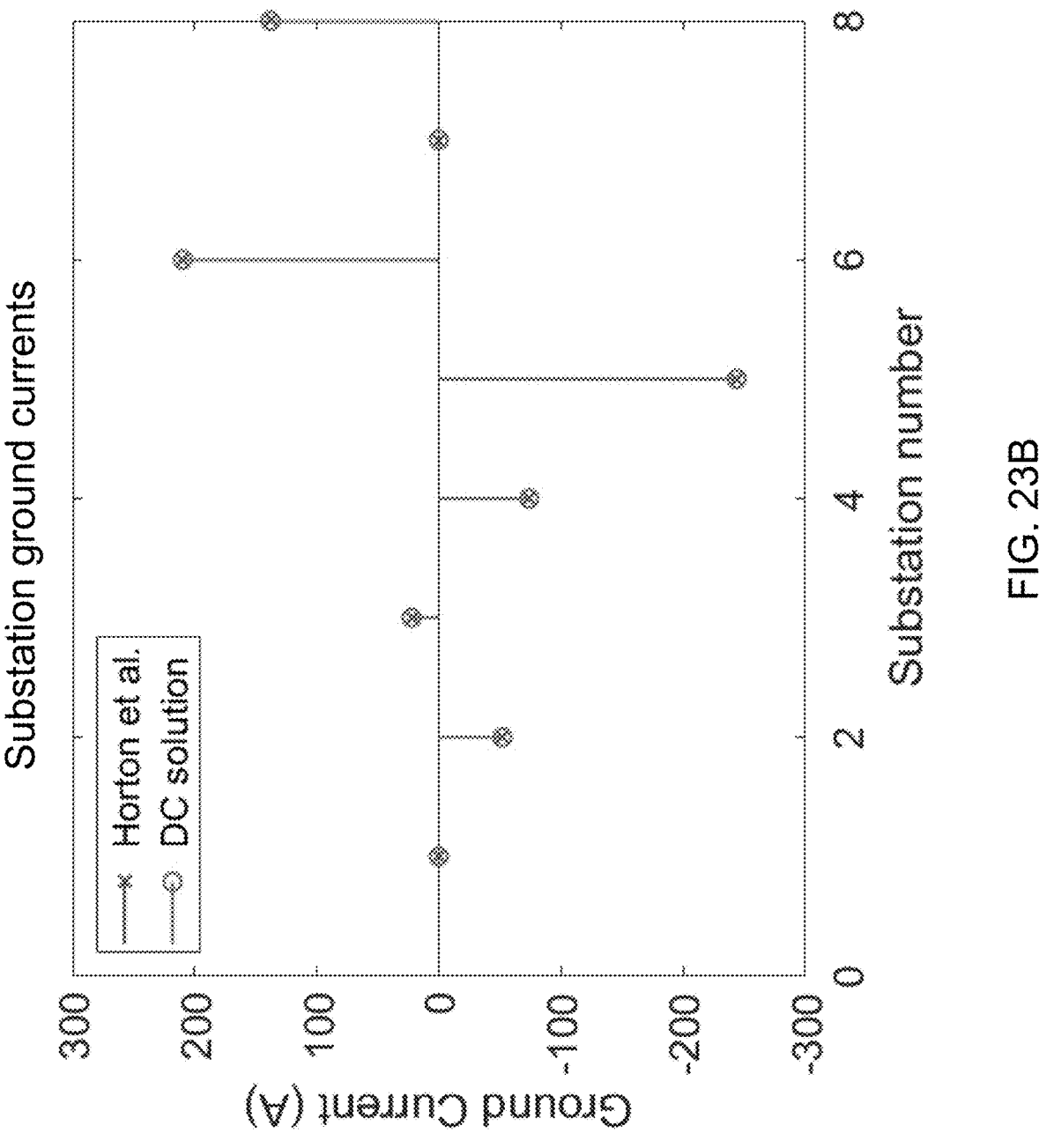

This equation was solved numerically using fsolve in MATLAB, with u=0, and from the solution it is possible to compare grid quantities (e.g., bus voltages) with the corresponding published values. FIGS. 23A and 23B show the results for the system bus voltages and substation ground currents, respectively. These values are also listed in Table IX and Table X. For this example, it was assumed a dc electric field of 1V/km with a north-east (NE) orientation was impacting the system. In Horton et al., the values for a north and east oriented insult are provided, and any other orientation can be determined by an interpolation formula:

$$s = N_s \cos(\theta) + E_s \sin(\theta) \qquad (23)$$

where s is the quantity of interest, $N_s$ and $E_s$ correspond to the listed northern and eastern E-field solutions, and $\theta$ corresponds to the actual angle of the applied electric field.

TABLE IX

| | | | Bus Voltages | | |
|---|---|---|---|---|---|
| Bus # | $N_s$ | $E_s$ | Horton et al.[1] | DC solution[2] | Error (%) |
| 2 | −12.4 | −190 | −143.1 | −143.1 | 0.01 |
| 3 | 20 | −125.1 | −74.3 | −74.2 | 0.1 |
| 4 | 20.3 | −126 | −74.7 | −74.8 | 0.1 |
| 5 | −29 | −7.3 | −25.6 | −25.7 | 0.09 |
| 6 | −7.2 | 44.3 | 26.3 | 26.2 | 0.33 |
| 11 | 60.6 | −40.5 | 14.2 | 14.4 | 1.02 |
| 12 | 7.1 | 15.7 | 16.1 | 16.1 | 0.11 |
| 15 | 30.1 | −24.4 | 4 | 3.8 | 4.76 |
| 16 | 29.4 | −23 | 4.5 | 4.4 | 3.51 |
| 17 | 25.1 | −41 | −11.3 | −11.3 | 0.02 |
| 20 | −29 | −6.1 | −24.9 | −24.9 | 0.07 |

1. Calculated using Eq. (23), with $\theta = \pi/4$ for a NE field orientation
2. Calculated by solving Eq. (22)

TABLE X

| | | | Substation Ground Currents | | |
|---|---|---|---|---|---|
| Sub # | $N_s$ | $E_s$ | Horton et al. | DC solution | Error (%) |
| 1 | 0 | 0 | 0 | 0 | 0 |
| 2 | 115.6 | −189.3 | −52.1 | −52.1 | 0.01 |
| 3 | 139.9 | −109.5 | 21.5 | 22.2 | 3.61 |
| 4 | 20 | −124.6 | −74 | −73.8 | 0.24 |
| 5 | −279.1 | −65.5 | −243.6 | −243.8 | 0.07 |
| 6 | −57.3 | 354.5 | 210.2 | 209.5 | 0.31 |
| 7 | 0 | 0 | 0 | 0 | 0 |
| 8 | 60.9 | 134.3 | 138 | 137.9 | 0.08 |

System Response to an E3b Insult

Figure 24A:
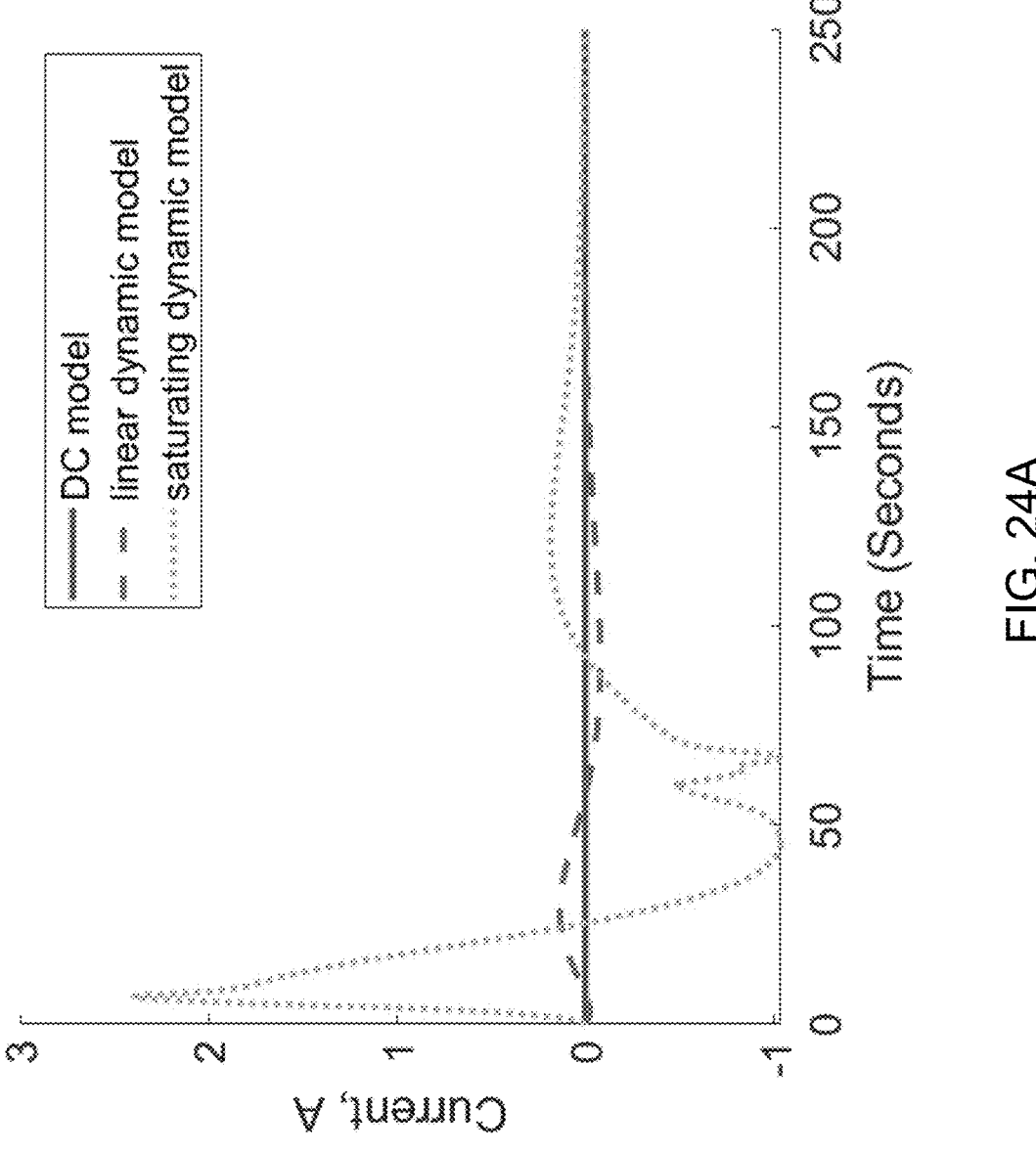
FIGS. 24A and 24B show GICs flowing due to a simulated E3b insult through two demonstrative transmission lines in the 20-bus power system.
Figure 24B:
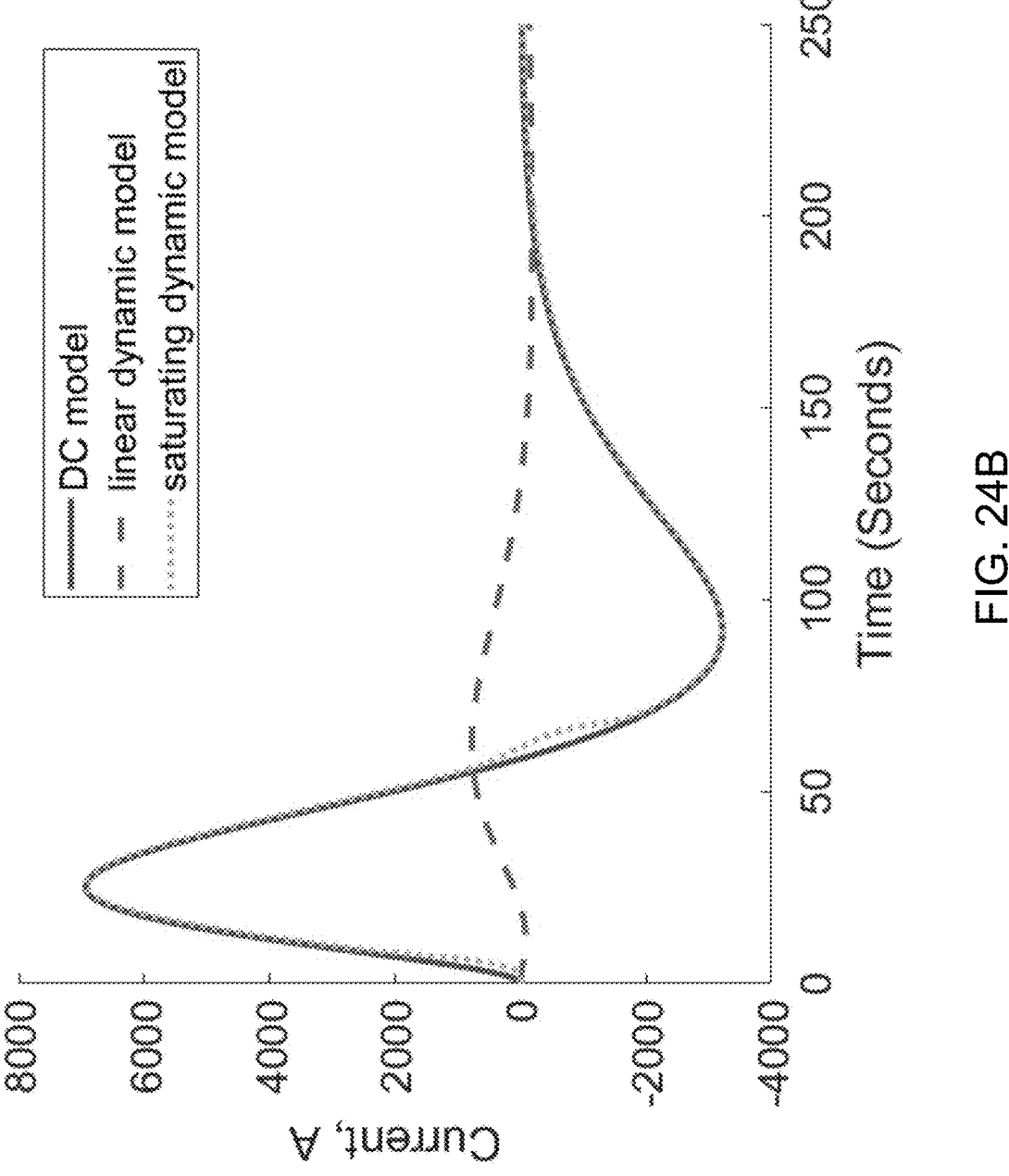

To further evaluate the dynamic model, the system response to an E3b insult was examined. First, to demonstrate the impact that a blocking capacitor can have transmission line currents, FIG. 24A shows the current in the line connecting substations 5 and 7, and FIG. 24B shows the current for the line connecting substations 5 and 6. As shown in FIG. 22, the line connecting substations 5 and 7 includes a series blocking capacitor (BD), whereas line 5-6 does not. This accounts for the large difference in current magnitude between these two plots.

FIGS. 24A and 24B also show how three different models of the system vary in terms of predicted line currents. In the de model, line currents are predicted assuming the dynamic elements of the system can be neglected. This is accomplished by using the dc solution found in Eq. (22), and scaling x by the amplitude of the applied electric field at each instant in time. With the linear dynamic model, the saturating transformer model was linearized, but otherwise the model equations are the same as in Eq. (21). Finally, for the saturating dynamic model, the line currents are predicted using the full nonlinear dynamic model as described above.

Interestingly, in FIG. 24B, the dc model and the saturating dynamic model behave similarly, whereas the linear dynamic model generally shows slower dynamics. This behavior can intuitively be explained by considering the incremental inductance of transformers: for the linear dynamic model, the inductance is fixed at a relatively large value (500 p.u., as in FIG. 2), which accounts for the slow response. In contrast, for the saturating model, the incremental inductance decreases as the transformer magnetizing current increases. Thus, when the E3b waveform saturates the transformers in the system and decreases their corresponding incremental inductance, the current in the transmission lines becomes dominated by the resistance of network and not the inductance of the network.

Figure 25A:
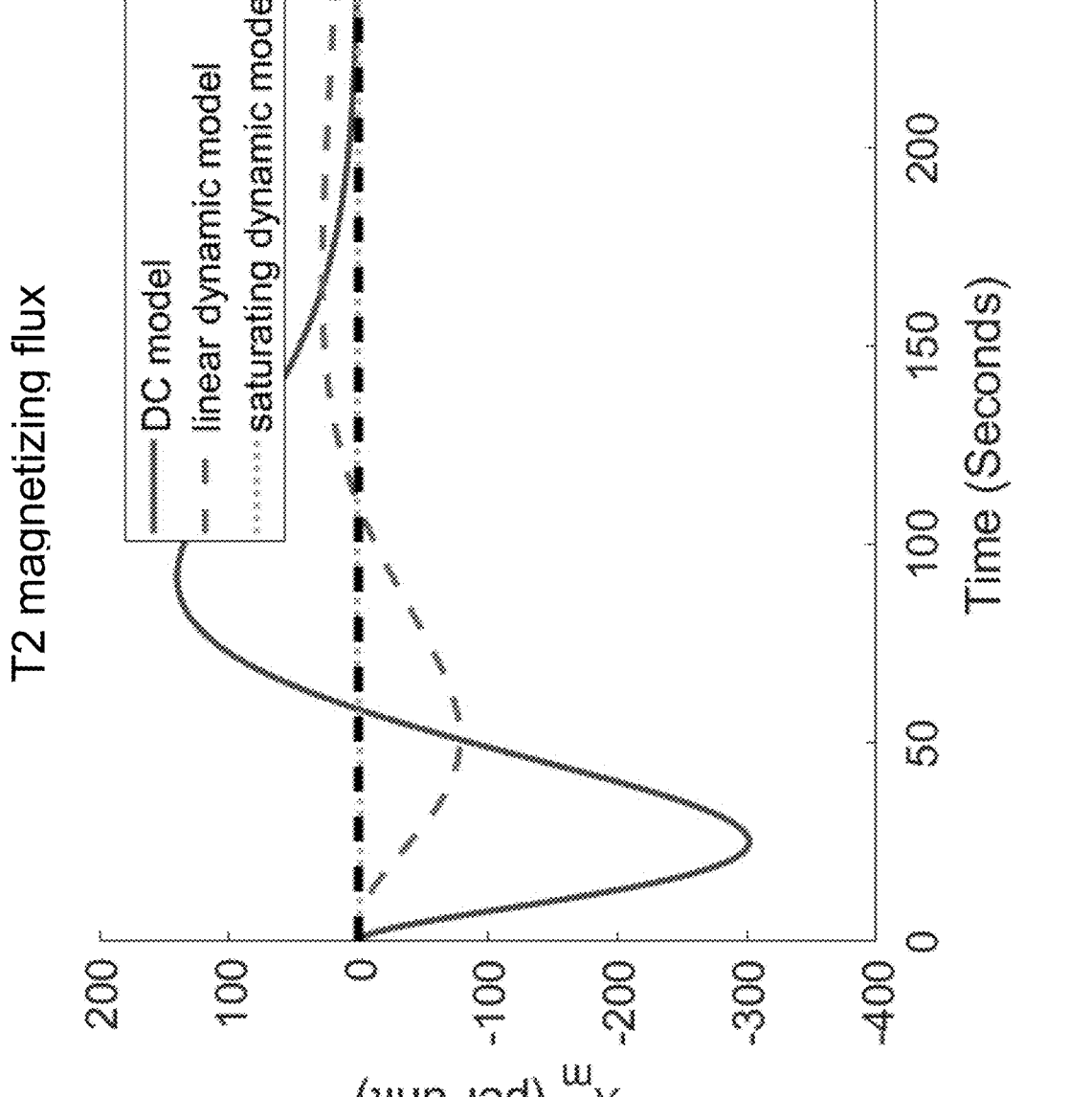
FIGS. 25A and 25B are graphs of magnetizing flux in transformer T2.
Figure 25B:
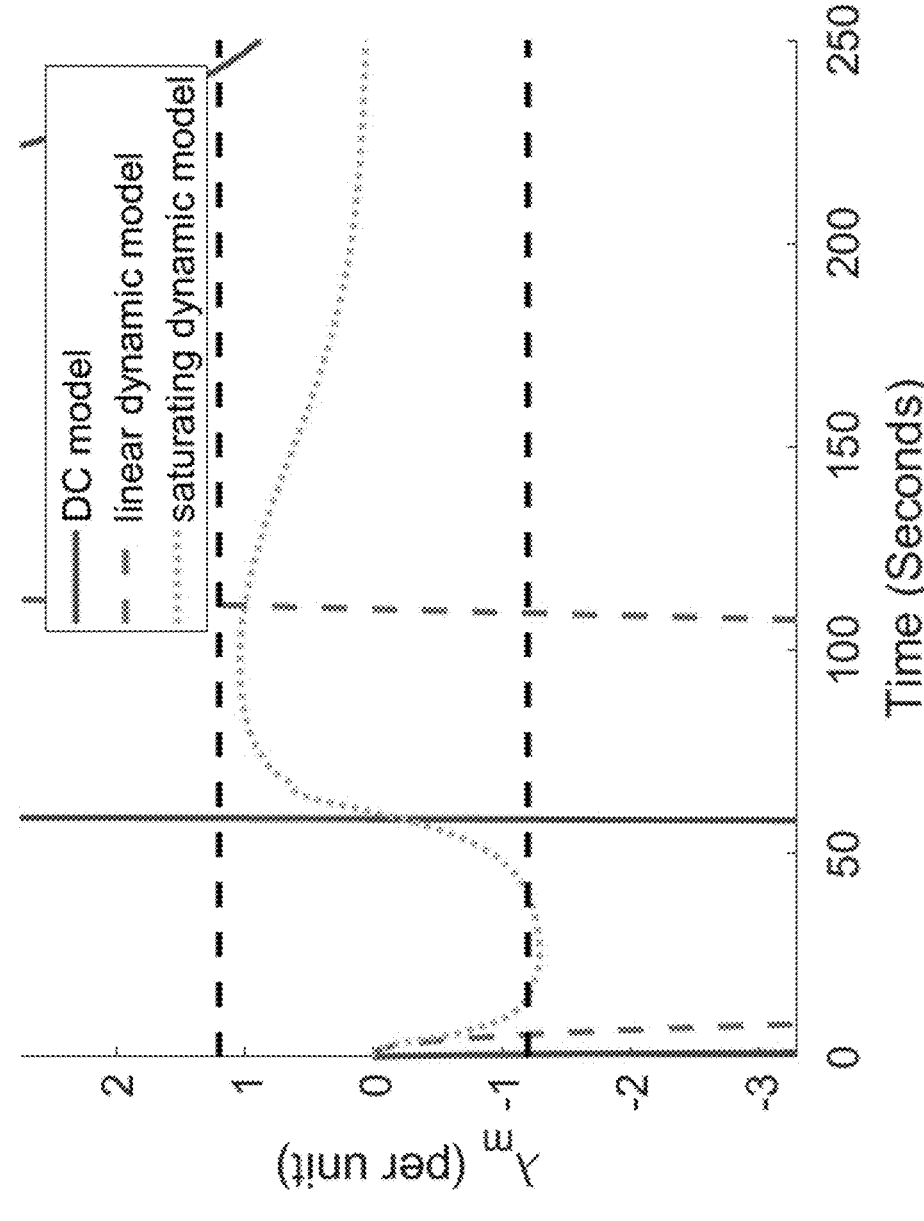

Although the dc model and saturating dynamic model show similar behavior for the line currents, the models differ significantly in their prediction of transformer magnetizing flux. For illustration, FIGS. 25A and 25B show the magnetizing flux in transformer T2 (substation 4). FIG. 25A shows both the dc model, the linear dynamic model, and the saturating dynamic model with full scale. Since the dc model does not account for the transformer magnetizing inductance and its large effective impedance during a transient, the model predicts a much larger value of transformer flux than would be expected in a physical system. On the other hand, while the linear dynamic model does account for this inductance, it assumes that its values is independent of the magnetizing current, even for large currents that would saturate a real magnetic core. Thus its prediction of transformer flux is also much larger than would be expected in a physical power system.

A zoomed in version of FIG. 25A is shown in FIG. 25B. At this scale, the predicted transformer flux for the saturating dynamic model can be observed. In this case, the transformer flux is predicted to stay in a much more reasonable range of values. This simulated behavior is expected to more accurately represent the behavior of a real power system subjected to a E3b insult.

Optimal Mitigation

As described above, optimal control theory is a suitable approach for developing a top-down HEMP/GMD mitigation scheme for power system protection. Optimal control theory is broadly concerned with finding a control/input signal, u (t), which drives a dynamical system in such a way as to minimize a user defined objective function. The optimal control formulation is shown in Eq. (3). Therein, the optimization problem is solved to minimize an objective function J subject to the constraints that the solution must satisfy the system dynamics equations $\dot{x}(t) = f$ and any user specified path constraints, g.

Since saturating transformers are a primary cause of power system disruption from GICs, the optimal control problem is formulated to limit the magnitude of saturation that each transformer would experience. In particular, the path constraints in Eq. (3) were utilized to limit transformer saturation level at or below 1.2 per unit. Since there are an infinite number of possible control inputs that can limit the transformer flux in this way, the objective function was specified to minimize the control effort, $u^2$, while meeting these constraints.

Figures 26A, 26B:
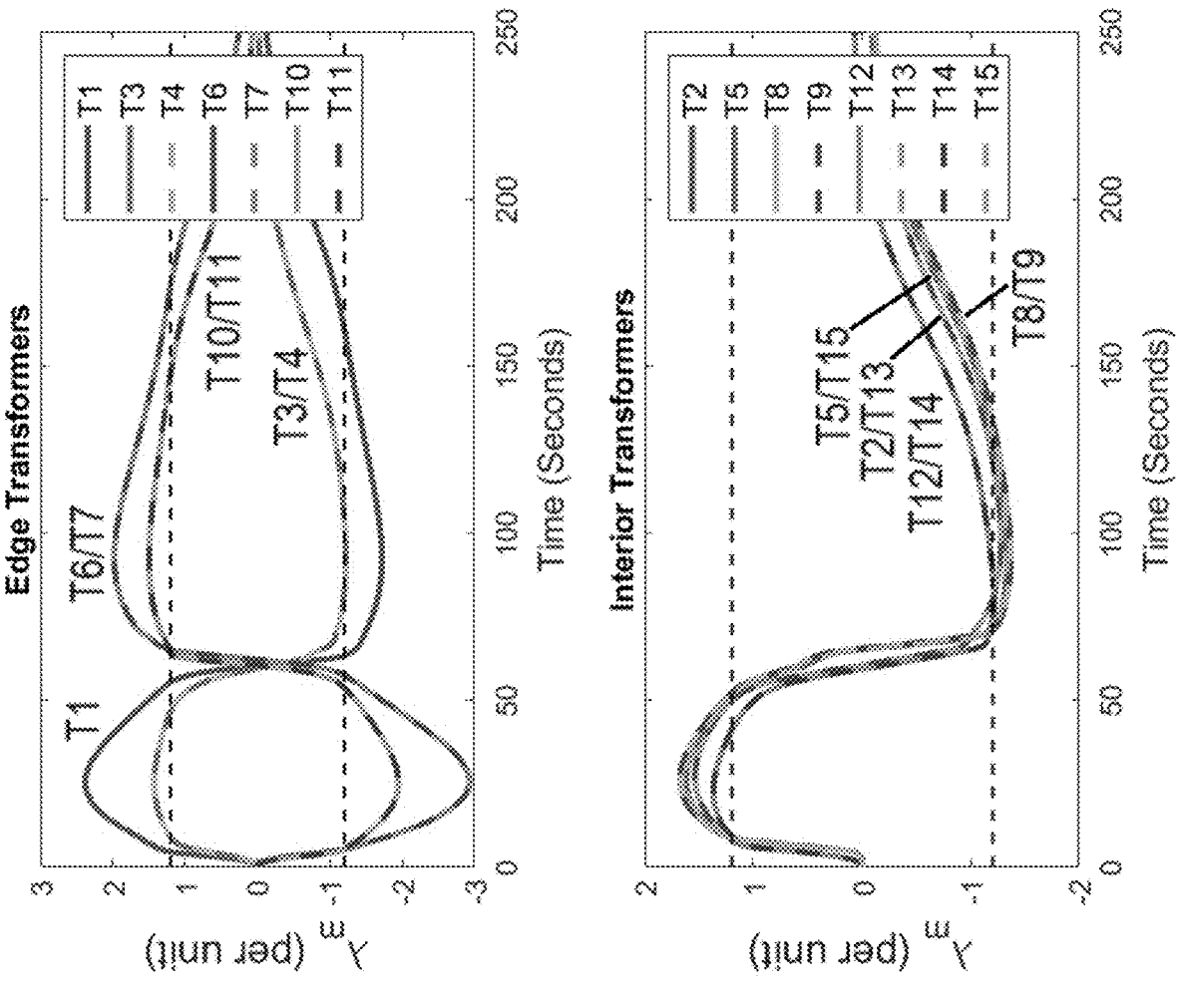
FIGS. 26A and 26B show the system response ($u_n$=0) to simulated E3b insult with no mitigation for the edge transformers (FIG. 26A) and the interior transformers (FIG. 26B).

The response of the system to an E3b insult when no mitigation $u=[u_{n,T1}, u_{n,T2} \ldots]=0$ is applied is shown in FIGS. 26A and 26B. Therein, the transformer magnetizing flux for each transformer is shown, and they are grouped according to if the transformer is an edge transformer (substations 1, 2, 6, 7, and 8) or an interior transformer (substations 3, 4, and 5; connecting the 345 kV system to the 500 KV system). In addition to the flux for each transformer, FIGS. 26A and 26B also show the 1.2 p.u. flux value with horizontal dashed lines. For the un-mitigated system, all transformers exceed this level of saturation. See D. M. Oliveira and C. M. Ngwira, *Braz. J. Phys.* 47(5), 552 (2017).

Figures 27A, 27B:
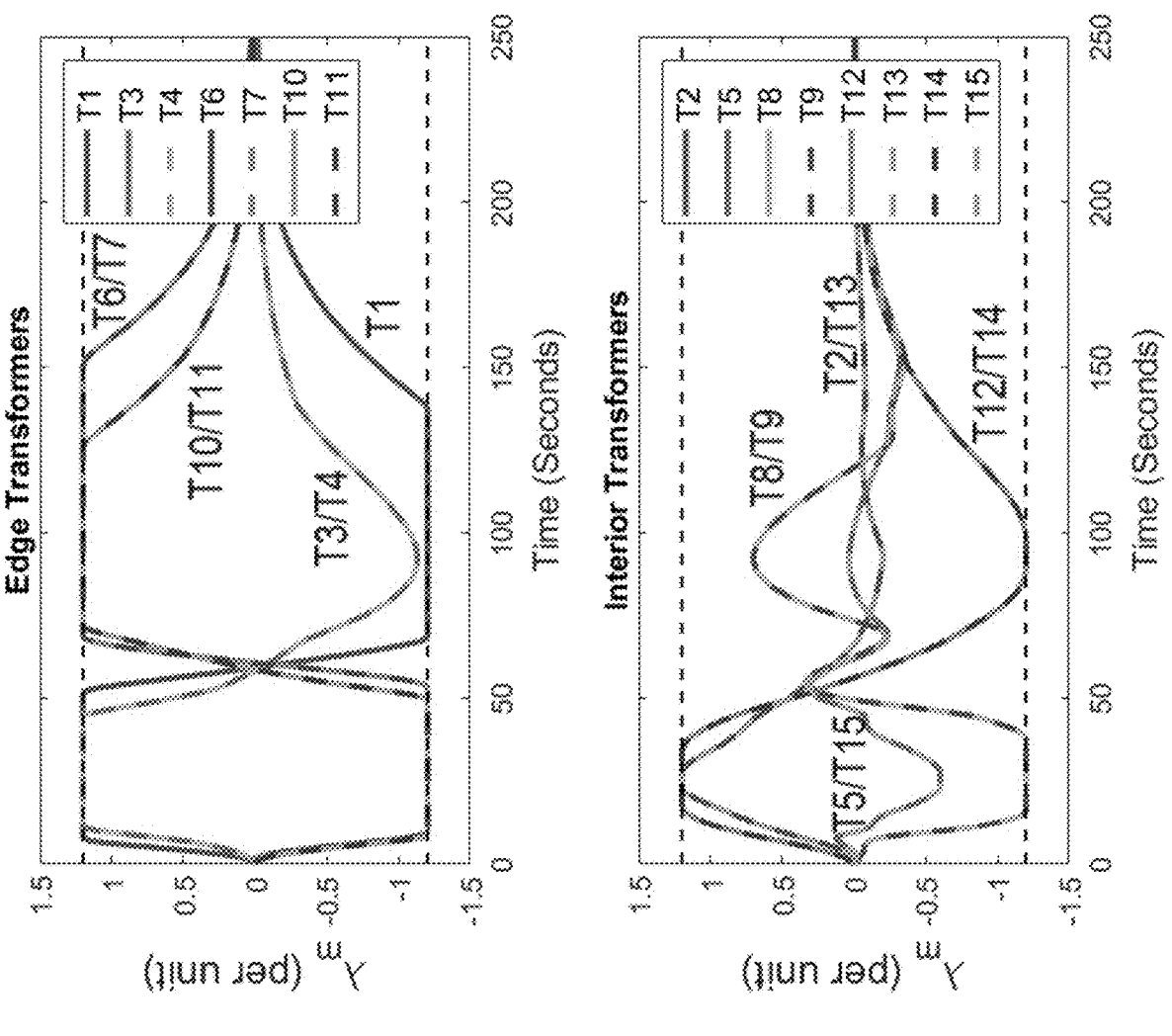
FIGS. 27A and 27B show the system response with optimal mitigation to limit transformer saturation for the edge transformers (FIG. 27A) and the interior transformers (FIG. 27B).

To compare with the uncontrolled response, the optimal control problem shown in Eq. (3) was solved to determine the control input u required to prevent system-wide transformer saturation. The optimal control problem was implemented in MATLAB and solved using a direct collocation software optim Traj. See M. Kelly, *SIAM Review* 59(4), 849 (2017). The transformer flux for this solution is shown in FIGS. 27A and 27B. The corresponding control inputs required to achieve this behavior are shown in FIGS. 28A and 28B, respectively.

Figures 28A, 28B:
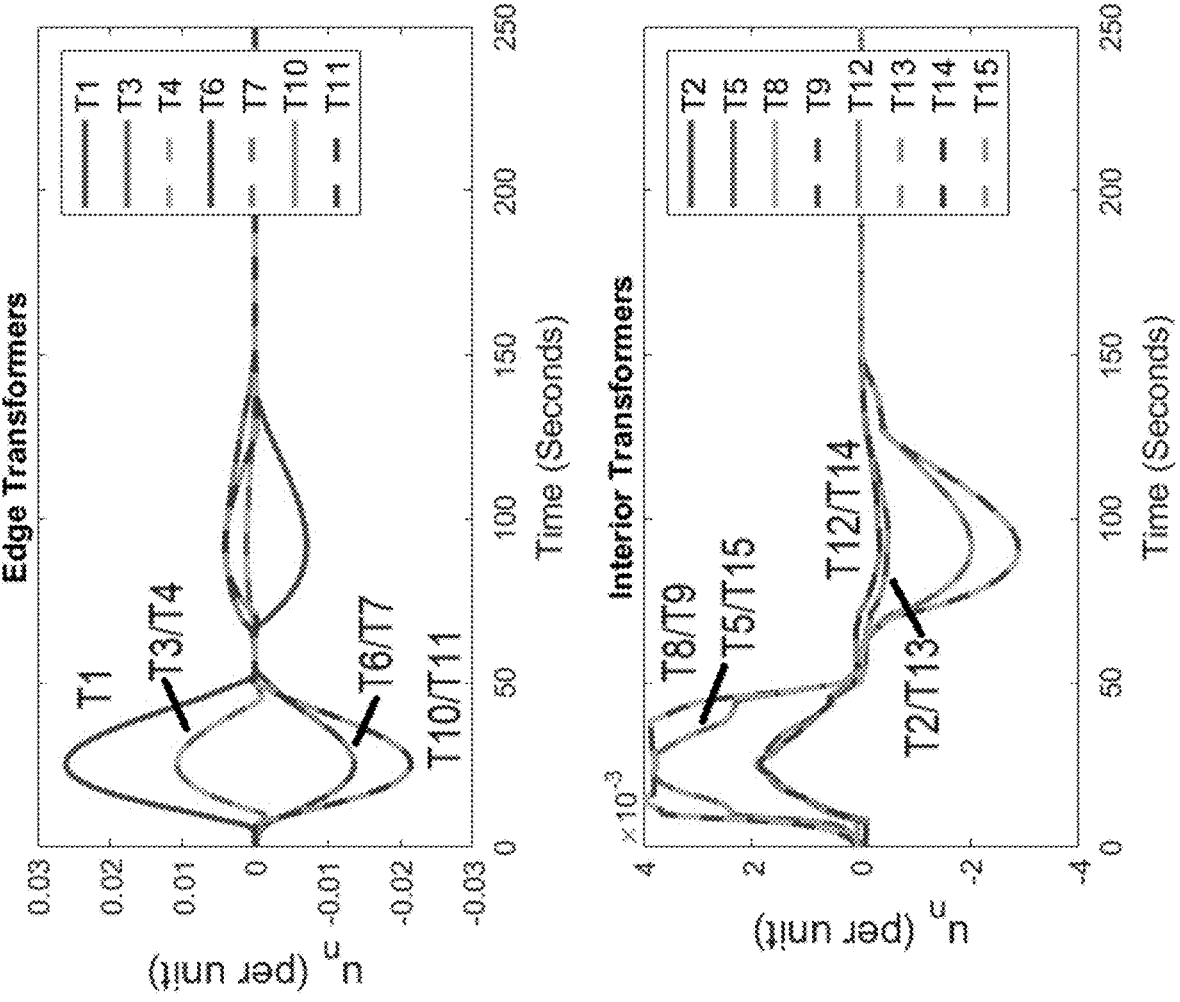
FIGS. 28A and 28B show the control inputs used for the responses shown in FIGS. 27A and 27B, respectively.

It is clear from FIGS. 27A and 27B that it is possible to prevent transformer saturation in this grid, and the cost to do so from FIGS. 28A and 28B is injecting a neutral voltage that is a fraction of the rated line voltages. However, it is also noted that this model assumes an arbitrary voltage profile can be generated for neutral path protection, and it assumes every transformer in the grid is equipped with a HEMP/GMD protection device.

The present invention has been described as a top-down control design strategy for power grid EMP protection. It will be understood that the above description is merely illustrative of the applications of the principles of the present invention, the scope of which is to be determined by the claims viewed in light of the specification. Other variants and modifications of the invention will be apparent to those of skill in the art.

The invention claimed is:

1. An electric power grid, comprising:
    at least one transformer comprising a transformer core and a transformer neutral, wherein a low frequency current pulse generates a magnetizing flux in the transformer core;
    a blocking device comprising a voltage source providing a neutral-path control signal between the transformer neutral and ground; and
    a flux-blocking device comprising a current source providing a magnetizing-path control signal to the transformer core;
    wherein the neutral-path control signal and the magnetizing-path control signal are optimized to keep the magnetizing flux below a saturation limit in response to the low frequency current pulse.

2. The electric power grid of claim 1, wherein the transformer core is characterized by a nonlinear magnetizing inductance.

3. The electric power grid of claim 1, wherein the low frequency current pulse comprises a geomagnetically-induced current.

4. The electric power grid of claim 1, wherein the low frequency current pulse has a frequency of less than 1 Hz.

5. The electric power grid of claim 1, wherein the blocking device comprises a linear quadratic regulator or an optimized controller based on the saturation limit.

6. The electric power grid of claim 1, wherein the blocking device comprises a blocking capacitor.

7. The electric power grid of claim 1, wherein the at least one of the neutral-path and magnetizing-path control signals is optimized by minimizing an objective function, J, according to $$\min_{x(t),u(t)} J = \int_{t_0}^{t_f} F(x(t), u(t), t)\, dt$$

such that, $$\dot{x}(t) = f(x(t), u(t))$$

$$lb \leq g(x(t), u(t)) \leq ub$$

where F is a cost function, $\dot{x}=f(\cdot)$ is a system dynamic equation, u(t) is the control signal, $t_f$ is a pulse interval, $g(\cdot)$ is the magnetizing flux lm, lb is a negative saturation limit, and ub is a positive saturation limit.

8. The electric power grid of claim 1, wherein the at least one transformer comprises a generator transformer and at least one load transformer, and wherein a low-frequency electromagnetic pulse is coupled to a transmission line connecting the generator transformer to the at least one load transformer.

9. The electric power grid of claim 8, wherein the at least one load transformer comprises two or more load transformers in parallel and wherein each of the load transformers has a separate blocking device and/or flux-blocking device providing a separate neutral-path control signal and/or magnetizing-path control signal for each of the load transformers.

10. The electric power grid of claim 8, wherein the at least one load transformer comprises two or more load transformers in parallel and wherein the neutral-path control signal and/or the magnetizing-path control signal from one of the load transformers is optimized to minimize transformer saturation at a system-level.

* * * * *